United States Patent
Moriwaki

(10) Patent No.: US 8,819,117 B2
(45) Date of Patent: Aug. 26, 2014

(54) DISPLAY OF IMAGES ON A MAP USING IMAGE POSITION INFORMATION

(75) Inventor: Kenichi Moriwaki, Tokyo (JP)

(73) Assignee: Sony Corporation (JP)

( * ) Notice: Subject to any disclaimer, the term of this patent is extended or adjusted under 35 U.S.C. 154(b) by 393 days.

(21) Appl. No.: 12/735,302

(22) PCT Filed: Oct. 28, 2009

(86) PCT No.: PCT/JP2009/068491
§ 371 (c)(1),
(2), (4) Date: Jun. 29, 2010

(87) PCT Pub. No.: WO2010/061708
PCT Pub. Date: Jun. 3, 2010

(65) Prior Publication Data
US 2010/0293224 A1 Nov. 18, 2010

(30) Foreign Application Priority Data
Nov. 26, 2008 (JP) ................................. 2008-301447

(51) Int. Cl.
*G06F 15/16* (2006.01)
*G06K 9/54* (2006.01)
*G06F 3/12* (2006.01)
*G08G 1/123* (2006.01)

(52) U.S. Cl.
USPC .......... 709/203; 358/1.15; 382/305; 701/408; 701/532

(58) Field of Classification Search
USPC .................. 709/203, 219; 358/1.15; 382/305; 701/408, 532
See application file for complete search history.

(56) References Cited

U.S. PATENT DOCUMENTS

| 8,131,118 | B1* | 3/2012 | Jing et al. ...................... 382/305 |
| 2003/0100316 | A1* | 5/2003 | Odamura ..................... 455/456 |
| 2004/0080434 | A1* | 4/2004 | Watanabe et al. .......... 340/995.1 |
| 2005/0206975 | A1* | 9/2005 | Funazaki ...................... 358/505 |
| 2007/0110316 | A1 | 5/2007 | Ohashi |
| 2007/0279438 | A1 | 12/2007 | Takakura et al. |
| 2008/0129835 | A1* | 6/2008 | Chambers et al. ......... 348/231.2 |

FOREIGN PATENT DOCUMENTS

| JP | 2003-114615 A | 4/2003 |
| JP | 2006-142505 A | 6/2006 |
| JP | 2006-279764 A | 10/2006 |
| JP | 2007-058088 A | 3/2007 |
| JP | 2007-133825 A | 5/2007 |
| JP | 2007-166084 A | 6/2007 |
| JP | 2007-323543 A | 12/2007 |

* cited by examiner

Primary Examiner — Jeong S Park
(74) Attorney, Agent, or Firm — Lerner, David, Littenberg, Krumholz & Mentlik, LLP

(57) ABSTRACT

There is provided an image processing apparatus including: a position information extraction unit that extracts position information from image data selected by a user; a communication control unit that exchanges data with various servers via a communication network; a map image acquisition unit that acquires a map image corresponding to the position information, extracted by the position information extraction unit, from a map information providing server; a landmark information acquisition unit that acquires landmark information corresponding to the position information, extracted by the position information extraction unit, from a landmark information providing server; an associated image acquisition unit that acquires an associated image corresponding to the landmark information, acquired by the landmark information acquisition unit, from an image sharing server; and a display unit that displays the image data selected by the user, the map image, the landmark information and the associated image.

10 Claims, 14 Drawing Sheets

DISPLAY OF IMAGES ON A MAP USING IMAGE POSITION INFORMATION

CROSS-REFERENCES TO RELATED APPLICATIONS

The present application is a national phase entry under 35 U.S.C. §371 of International Application No. PCT/JP2009/068491 filed Oct. 28, 2009, published on Jun. 3, 2010 as WO 2010/061708 A1, which claims priority from Japanese Patent Application No. JP 2008-301447 filed in the Japanese Patent Office on Nov. 26, 2008.

TECHNICAL FIELD

The present invention relates to an image processing apparatus, an image processing method, an image processing program and image processing system.

BACKGROUND ART

In recent years, there is widely used a technique for acquiring position information on a current position by a measurement using a global positioning system (GPS) employing a satellite. For example, there is disclosed in Patent Document 1 a technique in which a cell phone includes a GPS function to display a peripheral map and landmark information of a current position based on the current position information.

Further, a cell phone or digital camera can specify a photographing position by the GPS function and add position information on the photographing position to photographed image data. There is disclosed in Patent Document 2-5 and the like a technique utilizing the image data containing the position information photographed in this manner.

Patent Document 2 discloses therein a technique for direct printing capable of displaying a photographing position, landmark information and the like based on the position information recorded in an image photographed by a digital camera and applying to narrowing or searching for an image to be printed.

Further, Patent Document 3 discloses therein a technique in which a digital camera displays a map containing information on the landmarks near the photographing position based on the position information recorded in the photographed image. The digital camera holds a database for map images or landmark information. The digital camera can extract a map image containing the information on the landmarks near the photographing position from the database based on the position information recorded in the photographed image when displaying the photographed image, and can display the map image together with the photographed image.

Further, Patent Document 4 discloses therein a technique for searching for landmarks near the photographing position based on the position information recorded in the image photographed by a digital camera.

Further, Patent Document 5 discloses therein a technique for utilizing the GPS function of the digital camera to search for an image photographed near a current position from among the previously-photographed images recorded in a memory.

In this manner, the digital camera mounts the GPS function thereon to add position information to the photographed image, thereby utilizing the position information for displaying or searching for the photographed image.

The image photographed by a digital camera or the like is not only displayed on a display of the digital camera but also utilized in an external device or the services over the network, and consequently a service form utilizing the photographed images is being extended.

For example, since a display on the digital camera is small and has restriction on batteries, a user can enjoy the images photographed by the digital camera to be displayed on a large-screen TV or personal computer. The images photographed by the digital camera can be uploaded and publicized on an image sharing service site over the Internet, for example. The images photographed by other person's digital camera, which are publicized on such an image sharing service site, can be downloaded and acquired.

CITATION LIST

Patent Literature
  Patent Literature 1: JP 2003-114615 (A)
  Patent Literature 2: JP 2006-142505 (A)
  Patent Literature 3: JP 2007-166084 (A)
  Patent Literature 4: JP 2007-133825 (A)
  Patent Literature 1: JP 2006-279764 (A)

SUMMARY OF INVENTION

Technical Problem

However, the technique described in each patent documents above is directed for displaying a map image or landmark information of a photographing location when displaying a photographed image or for utilizing position information when searching for the photographed image. In other words, the technique on a digital camera described in each patent documents above is directed for enhancing usability such as display or retrieval of the existing photographed images.

Thus, for example, the technique described in each patent documents above has an issue that when a service over the network as described above is utilized to download or upload a photographed image, position information recorded in the photographed image may not be utilized. Therefore, it is desired to propose a method for utilizing position information corresponding to an extended service form utilizing the images photographed by a digital camera.

The present invention is made in view of the above-mentioned issue, and aims to provide a novel and improved image processing apparatus, image processing method, image processing program and image processing system capable of efficiently utilizing various services on the photographed images over the network based on position information recorded in the photographed images.

Solution to Problem

According to the first aspect of the present invention in order to achieve the above-mentioned object, there is provided an image processing apparatus including a position information extraction unit that extracts position information from image data selected by a user, a communication control unit that exchanges data, via a communication network, with a map information providing server for providing map images, a landmark information providing server for providing landmark information on landmarks, and an image sharing server for providing a service of publicizing image data over the Internet, a map image acquisition unit that transmits the position information extracted by the position information extraction unit to the map information providing server and acquires a map image corresponding to the extracted position information from the map information providing server, via the communication control unit, a landmark information acquisition unit that transmits the position information extracted by the position information extraction unit to the landmark information providing server and acquires landmark information corresponding to the extracted position information from the landmark information providing server, via the communication control unit, an associated image acquisition unit that transmits the landmark information acquired by the landmark information acquisition unit to the image sharing server and acquires an associated image corresponding to the acquired landmark information from the image sharing server, via the communication control unit, and a display unit that displays the image data selected by the user, the map image acquired from the map information providing server, the landmark information acquired from the landmark information providing server and the associated image acquired from the image sharing server.

According to the above configuration, the map image acquisition unit of the image processing apparatus can acquires a map image corresponding to the position information recorded in the image data selected by the user from the map information providing server. Moreover, the landmark information acquisition unit can acquire the landmark information corresponding to the position information recorded in the image data selected by the user from the landmark information providing server. Also, the associated image acquisition unit can acquire the associated image related to the landmark information acquired by the landmark information acquisition unit from the image sharing server. Further, the display unit can display the mage data selected by the user, the map image acquired from the map information providing server, the landmark information acquired from the landmark: information providing server, and the associated image acquired from the image sharing server.

Further, the display unit can also display the image data, the landmark information and the associated image to be overlapped on the map image acquired from the map information providing server at corresponding positions, respectively.

Further, the display unit can also sequentially display a plurality of associated images acquired by the associated image acquisition unit.

Further, the display unit can also sequentially displays the associated images in an order from the nearest date to the photographing date of the image selected by the user, based on the photographing dates recorded in the associated images.

Further, the landmark information acquired by the landmark information acquisition unit may be information on landmarks present around the position corresponding to the position information extracted by the position information extraction unit.

Further, the associated image acquired by the associated image acquisition unit may be image data recording therein the landmark information acquired by the landmark information acquisition unit as tag information among the image data publicized over the Internet by the image sharing server.

Moreover, the image processing apparatus may further include an image data upload control unit that adds the landmark information acquired by the landmark information acquisition unit to the image data selected by the user to transmit to the image sharing server and requests to publicize the image data with an image sharing service over the Internet provided by the image sharing server.

Furthermore, according to another embodiment of the present invention, there is provided an image processing method which includes the steps of extracting a position information from image data selected by a user, acquiring a map image, wherein the position information extracted in the step of extracting the position information is transmitted to a map information providing server for providing map images via a communication network and a map image corresponding to the extracted position information is acquired from the map information providing server, acquiring a landmark information, wherein the position information extracted in the step of extracting the position information is transmitted to a landmark information providing server for providing landmark information on landmarks via the communication network and the landmark information corresponding to the extracted position information is acquired from the landmark information providing server, acquiring an associated image acquisition, wherein the landmark information acquired in the step of acquiring the landmark information is transmitted to the image sharing server via the communication network and an associated image corresponding to the acquired landmark information is acquired from the image sharing server, and displaying the image data selected by the user, the map image acquired in the step of acquiring the map information, the landmark information acquired in the step of acquiring the landmark information and the associated image acquired in the step of acquiring the associated image.

Furthermore, according to another embodiment of the present invention, there is provided an image processing program for causing a computer to execute the processes of extracting a position information from image data selected by a user, acquiring a map image, wherein the position information extracted by the process of extracting the position information is transmitted to a map information providing server for providing map images via a communication network and a map image corresponding to the extracted position information is acquired from the map information providing server, acquiring a landmark information, wherein the position information extracted by the process of extracting the position information is transmitted to a landmark information providing server for providing landmark information on landmarks via the communication network and the landmark information corresponding to the extracted position information is acquired from the landmark information providing server, acquiring an associated image, wherein the landmark information acquired by the process of acquiring the landmark information is transmitted to the image sharing server via the communication network and an associated image corresponding to the acquired landmark information is acquired from the image sharing server, and displaying the image data selected by the user, the map image acquired by the process of acquiring the map information, the landmark information acquired by the process of acquiring the landmark information, and the associated image acquired by the process of acquiring the associated image.

Furthermore, according to another embodiment of the present invention, there is provided an image processing system including: an image processing apparatus having a position information extraction unit that extracts position information from image data selected by a user, a communication control unit that exchanges data, via a communication network, with a map information providing server for providing map images, a landmark information providing server for providing landmark information on landmarks, and an image sharing server for providing a service of publicizing image data over the Internet, a map image acquisition unit that transmits the position information extracted by the position information extraction unit to the map information providing server and acquires a map image corresponding to the extracted position information from the map information providing server, via the communication control unit, a landmark information acquisition unit that transmits the position information extracted by the position information extraction unit to the landmark information providing server and acquires landmark information corresponding to the extracted position information from the landmark information providing server, via the communication control unit, an associated image acquisition unit that transmits the landmark information acquired by the landmark information acquisition unit to the image sharing server and acquires an associated image corresponding to the acquired landmark information from the image sharing server, via the communication control unit, and a display unit that displays the image data selected by the user, the map image acquired from the image information providing server, the landmark information acquired from the landmark information providing server and the associated image acquired from the image sharing server; a map image providing server having a storage unit that stores map images corresponded to predetermined position information, a map image retrieval unit that retrieves a map image corresponding to the position information transmitted from the image processing apparatus from among a plurality of map images recorded in the storage unit in response to a request from the image processing apparatus, and a map image providing unit that transmits the map image retrieved by the map image retrieval unit to the image processing apparatus via a communication network; a landmark information providing server having a storage unit that stores landmark information corresponded to predetermined position information, a landmark information retrieval unit that retrieves landmark information corresponding to the position information transmitted from the image processing apparatus from among a plurality of landmark information recorded in the storage unit in response to a request from the image processing apparatus, and a landmark information providing unit that transmits the landmark information retrieved by the landmark information retrieval unit to the image processing apparatus via a communication network; and an image sharing server having a storage unit that stores image data recording therein predetermined tag information containing landmark information, an associated image retrieval unit that retrieves image data, containing the landmark information transmitted from the image processing apparatus as the tag information, from among a plurality of image data recorded in the storage unit in response to a request from the image processing apparatus, and an associated image providing unit that transmits the image data retrieved by the associated image retrieval unit as an associated image to the image processing apparatus via a communication network.

Advantageous Effects of Invention

According to the present invention described above, it is possible to efficiently utilize various services on the photographed images over the network based on the position information recorded in the photographed images.

DESCRIPTION OF EMBODIMENTS

Figure 1:
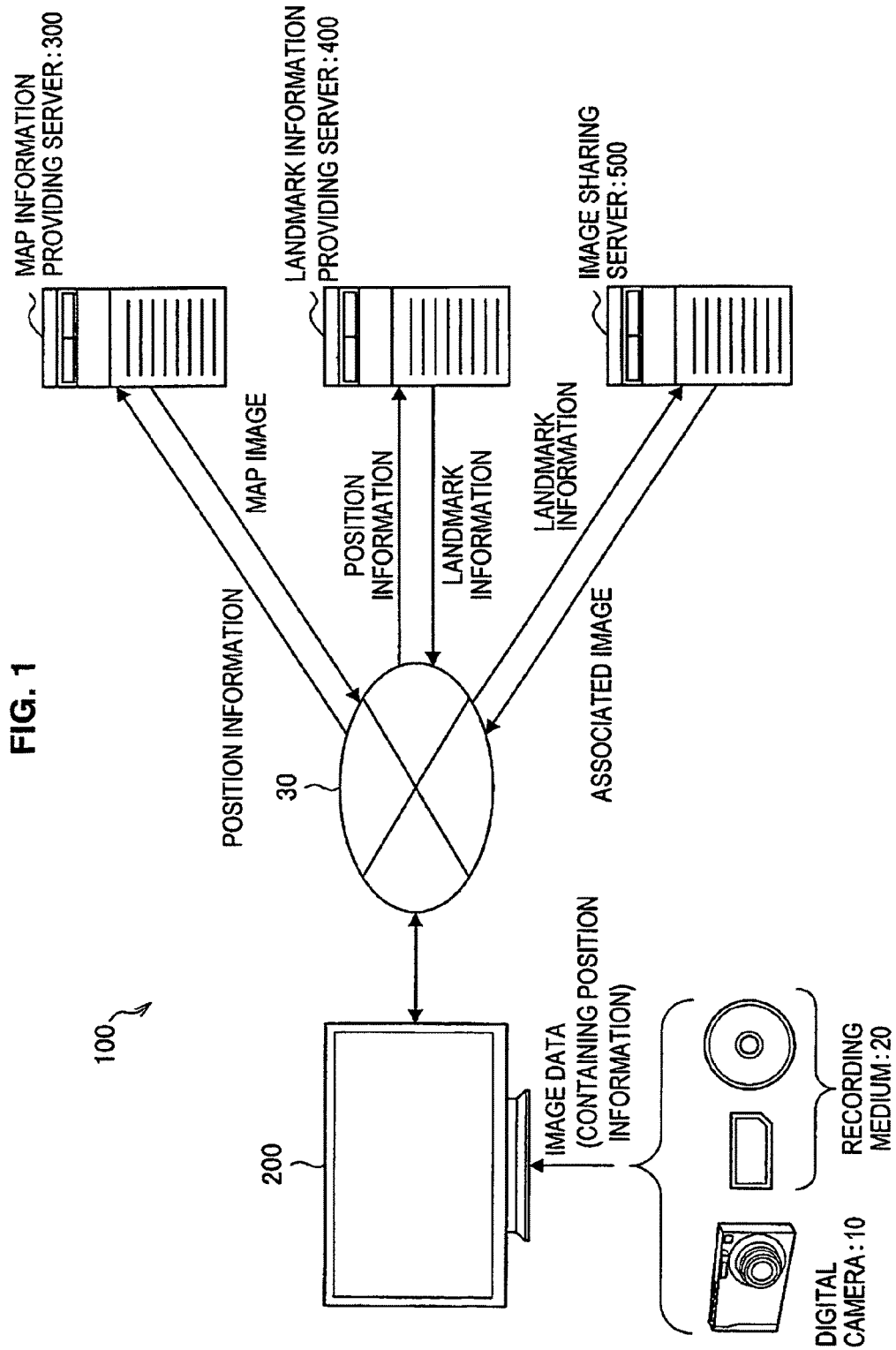
FIG. 1 is an explanatory diagram showing the entire configuration of an image processing system 100 utilizing a television 200 according to one embodiment.

Hereinafter, preferred embodiments of the present invention will be described in detail with reference to the appended drawings. Note that, in this specification and the appended drawings, structural elements that have substantially the same function and configuration are denoted with the same reference numerals, and repeated explanation of these structural elements is omitted.

1. Outline of embodiment of the present invention
2. Configuration of image processing system 100 according to one embodiment
3. Functional configuration of television receiver 200
4. Functional configuration of map information providing server 300
5. Functional configuration of landmark information providing server 400
6. Functional configuration of image sharing server 500
7. Image processing flow and display example
8. Variants
9. Hardware configuration of image processing apparatus (1. Outline of Embodiment of the Present Invention)

The outline of the present embodiment will be described before explaining the details of an image processing apparatus according to one embodiment of the present invention.

The image processing apparatus according to the present embodiment is an apparatus capable of displaying image data photographed by a digital camera on a display as typified by a television receiver, for example. In the following explanation, a television receiver (referred to as television below) will be exemplified as one example of the image processing apparatus according to the present embodiment.

A digital camera and, for example, a USB (Universal Serial Bus) are connected to each other so that the television can display the photographed images recorded in the digital camera on a display of the television. Further, the television can display the photographed images on the display by reading a recording medium recording therein the images photographed by the digital camera such as memory stick (registered trademark), SD card, DVD or CD.

The digital images photographed by a digital camera or the like are typically saved in the EXIF format as image file standard for digital camera. The image files photographed by a digital camera mounting the GPS (Global Positioning System) function thereon record therein position information such as latitude/longitude for additional information.

In recent years, there are widely used various services over the Internet utilizing the position information recorded in the image files. For example, there is known a technique for acquiring map information on a photographing location from a providing server over the Internet based on the position information and displaying the map information along with the image file.

A user can not only display the image files photographed by a digital camera on a display of digital camera or television but also enjoy utilizing various services over the Internet. For example, the user can upload and publicize his/her photographed images on the image sharing site over the Internet or download and view the images photographed by other persons.

Such an image sharing service typically enables an image file to be added any keywords such as location, person, genre, landmark and event as tag information. Thus, the user can search for and download a desired image file based on the tag information, or can add and upload any keywords as the tag information to his/her photographed image file.

The present embodiment enables to display the images photographed by a digital camera on a television along with the map information and to efficiently utilize the image sharing service over the Internet based on the position information recorded in the image file.

Specifically, there is acquired information on the landmarks present around the position corresponding to the position information based on the position information recorded in the image file via a communication network such as Internet. For example, when the user selects a predetermined image file displayed on the television, the television is connected to the landmark information providing server over the Internet so as to be able to acquire the landmark information present near the position where the image file was photographed.

The image data associated with the landmark is acquired based on the acquired landmark information via a communication network such as Internet. For example, when the user selects predetermined landmark information displayed on the television, the television is connected to the image sharing server or the like over the Internet, thereby acquiring the image data containing the landmark information as the tag information.

Thus, the television can not only display the image which the user photographed along with the map information but also display various photographs associated with the landmarks present near the position where the image was photographed on the display. Consequently, the user can easily acquire and view the photographs of the landmarks which he/she could not photograph at a travel destination or more beautiful associated photographs photographed by other persons based on the position information recorded in his/her photographed image file.

In other words, the television according to the present embodiment can efficiently utilize various services on the photographed images over the network based on the position information recorded in the photographed images. In the following, there will be described the details of the television as one example of the image processing apparatus having such characteristics.

(2. Configuration of Image Processing System 100 According to One Embodiment)

At first, a configuration of the image processing system 100 utilizing the television 200 according to one embodiment will be described. FIG. 1 is an explanatory diagram showing the entire configuration of the image processing system 100 according to one embodiment.

As shown in FIG. 1, the image processing system 100 is constituted to include the television 200, a map information providing server 300, a landmark information providing server 400 and an image sharing server 500 which are connected via a communication network 30 such as Internet.

The television 200 is connected to a digital camera 10 as shown in FIG. 1, thereby displaying the photographed images recorded in the digital camera 10 on a display. Note that the connection between the television 200 and the digital camera 10 is not limited to a specific connecting method whether in a wired or wireless manner as long as the photographed images recorded in the digital camera 10 can be transferred to the television 200.

The television 200 can display the photographed images on the display based on the image data recorded in the recording medium 20 as shown in FIG. 1. The user can typically record and carry the image data photographed by the digital camera 10 in the recording medium 20. The television 200 includes a reading unit of the recording medium 20 or the like, thereby reading the image data recorded in the recording medium 20 and displaying the photographed images on the display. Note that the recording medium 20 is, for example, a DVD media, compact flash (registered trademark), memory stick (registered trademark), SD memory card or the like, but is not limited to a specific recording medium as long as it can record the image data photographed by the digital camera 10.

The television 200 includes a communication unit (not shown) and thereby can access various information providing servers over the network via the communication network 30 such as Internet. Note that the communication network 30 is a communication line network for connecting in a bidirectionally-communicable manner between the television 200, the map information providing server 300, the landmark information providing server 400 and the image sharing server 500 respectively. The communication network 30 includes, for example, a public line network such as Internet, NGN (Next Generation Network) network, telephone line network, satellite communication network or broadcast communication path, a dedicated line network such as WAN (Wide Area Network), LAN (Local Area Network), IP-VPN (Internet Protocol-Virtual Private Network), Ethernet (registered trademark) or wireless LAN, or the like, irrespective of being wired or wireless.

The television 200 can transmit the position information contained in the image data to various servers or acquire predetermined information such as map information or landmark information from various servers by accessing various servers via the communication network 30.

The map information providing server 300 is a server for providing map information and the like over the Internet. The map information providing server 300 can provide a map image relating to a predetermined position in response to a user's request, for example. The map information includes a map image, aerial photograph, terrain image and the like within a predetermined range, for example. The map information providing server 300 can previously manage the map information corresponding to the position information such as predetermined latitude/longitude.

In the image processing system 100 according to the present embodiment, when receiving predetermined position information from the television 200, the map information providing server 300 transmits the map image of the position corresponding to the position information to the television 200. Thus, the television 200 can display the map image received from the map information providing server 300 on the display. At this time, the television 200 can display the image photographed by the digital camera 10, for example, to be overlapped on the map of the photographing location. Thus, the user can enjoy viewing the images photographed at a travel destination along with the map of the travel destination.

The landmark information providing server 400 is a server for providing various items of information on the landmarks over the Internet. The landmark information providing server 400 can provide the information on the landmarks present in a predetermined region in response to a user's request, for example. The landmark information includes various items of information such as name, business hours, referral and symbol mark of the landmark. The landmark information providing server 400 can previously manage the addresses of the landmarks as the landmark information to be associated with the position information such as latitude/longitude.

In the image processing system 100 according to the present embodiment, when receiving predetermined position information from the television 200, the landmark information providing server 400 transmits the information on the landmarks present around the position corresponding to the position information to the television 200. Thus, the television 200 can display the landmark information received from the landmark information providing server 400 on the display. At this time, the television 200 can display the images photographed by the digital camera 10 to be overlapped on the map of the photographing location and display the information of landmark therearound, for example. Thus, the user can not only view the images photographed at a travel destination along with the map of the travel destination but also enjoy viewing the information on the landmarks present around the photographed images.

The image sharing server 500 is a server for publicizing various image files or the like photographed by the user over the Internet. For example, the user can upload and publicize his/her photographed images on the image sharing server 500 to other users. Further, the user can download favorite images from among various images publicized by the image sharing server 500 for acquisition and view.

The image sharing server 500 can add, for example, any keywords such as location, position, person, genre, landmark and event as tag information to the image data for management. Thus, the user can search for and download desired image data based on the tag information or add and upload arbitrary tag information to image data he/she photographed.

In the image processing system 100 according to the present embodiment, when receiving predetermined landmark information from the television 200, the image sharing server 500 searches for the image data containing the landmark information as the tag information from the managed image data and transmits the searched image data to the television 200. Thus, the television 200 can display the image associated with the requested landmark on the display based on the image data received from the image sharing server 500. At this time, the television 200 can display the images photographed by the digital camera 10 to be overlapped on the map of the photographing location, and display the landmark information present therearound, and additionally display the image associated with the landmark. Thereby, the user can not only view the images photographed at a travel destination along with the map of the travel destination but also enjoy viewing the information on the landmarks present around the photographed images or the images associated with the landmarks.

There has been described above the entire configuration of the image processing system 100 according to the present embodiment but there will be described below detailed functional configurations of the television 200, the map information providing server 300, the landmark information providing server 400 and the image sharing server 500 which constitute the image processing system 100.

(3. Functional Configuration of Television Receiver 200)

Figure 2:
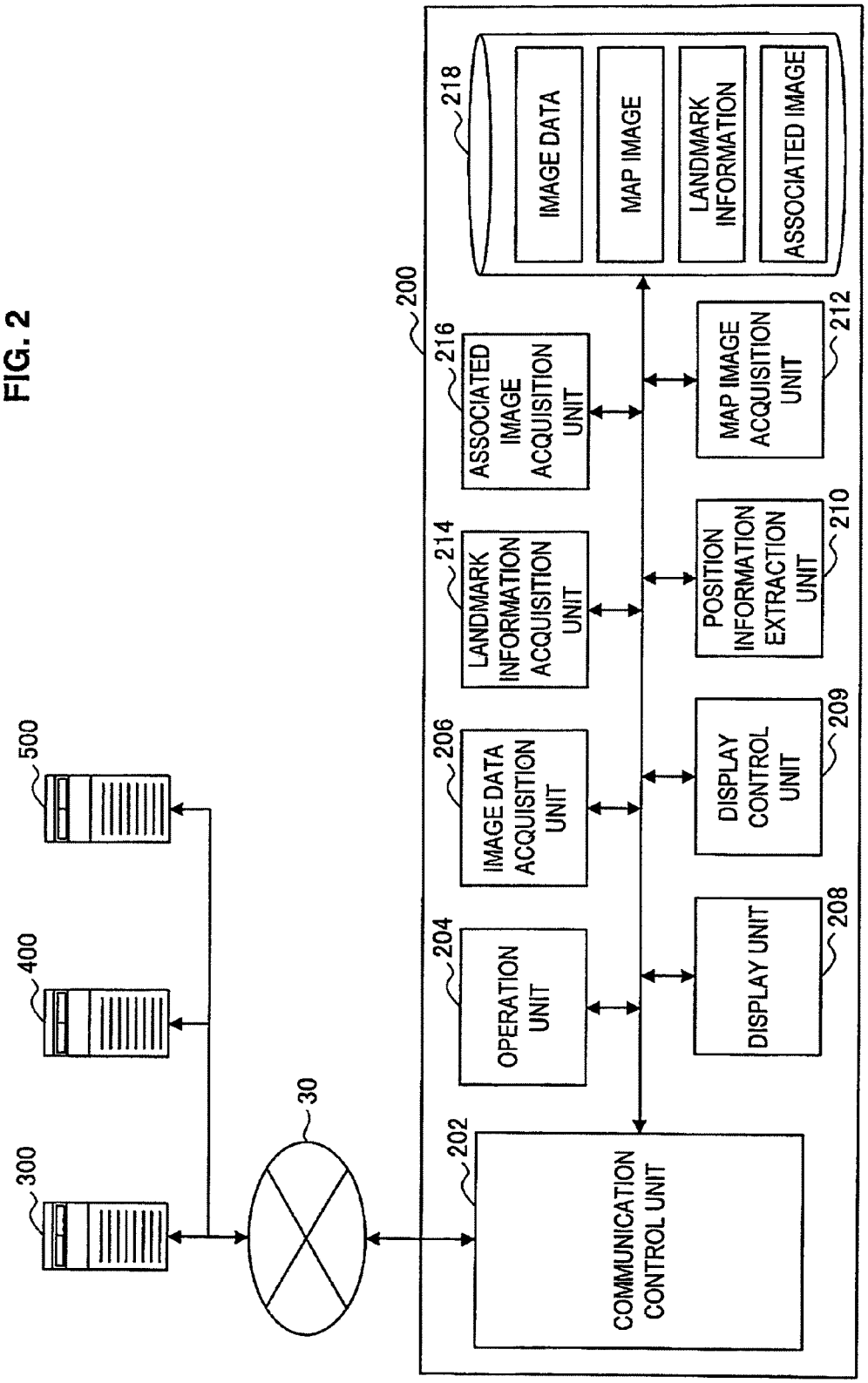
FIG. 2 is a block diagram showing a functional configuration of the television 200 according to the embodiment.

At first, a functional configuration of the television 200 according to the present embodiment will be described in detail. FIG. 2 is a block diagram showing the functional configuration of the television 200 according to the present embodiment.

The television 200 is mainly constituted to include a communication control unit 202, an operation unit 204, an image data acquisition unit 206, a display unit 208, a display control unit 209, a position information extraction unit 210, a map image acquisition unit 212, a landmark information acquisition unit 214, an associated image acquisition unit 216 and a storage unit 218. The functional configuration shown in FIG. 2 is one example of the functional configuration for realizing the characteristics of the television 200 according to the present embodiment described above, and the present invention is not limited thereto. The television 200 according to the present embodiment can naturally include various functions provided in a typical television such as broadcast receiving function, program guide acquiring function, content reproducing function, information setting function and recording function. In the following, each functional configuration unit for realizing the characteristics of the television 200 according to the present embodiment will be described.

(Communication Control Unit 202)

The communication control unit 202 is configured with a CPU (Central, Processing Unit), a ROM (Read Only Memory), a RAM (Random Access Memory) a communication device or the like, for example. The communication control unit 202 performs communication control of various data exchanged between the television 200 and the map information providing server 300, the landmark information providing server 400, and the image sharing server 500.

Specifically, the communication control unit 202 receives a request from each processing unit provided in the television 200 according to the present embodiment and transmits various data or signals to the map information providing server 300, the landmark information providing server 400 and the image sharing server 500. Further, the communication control unit 202 receives and transmits various data or signals transmitted from the map information providing server 300, the landmark information providing server 400 and the image sharing server 500, to each processing unit provided in the television 200 according to the present embodiment.

Further, the communication control unit 202 can utilize the storage unit 218 described later as a transmission/reception buffer.

(Operation Unit 204)

The operation unit 204 is configured with, for example, a CPU, a ROM, a RAM, an input device or the like and converts and transmits to a corresponding processing unit an operation performed on various input switches such as content selection switch and power supply switch provided in the television 200 into a predetermined signal. The operation unit 204 can receive and transfer to the corresponding processing unit, for example, the signals corresponding to various operations transmitted from an external remote controller.

The user directly operates the operation unit 204 or operates the external remote controller capable of being received by the operation unit 204, thereby instructing the television 200 to select predetermined contents, to access various servers, to acquire associated images, and the like.

(Image Data Acquisition Unit 206)

The image data acquisition unit 206 acquires the image data photographed by the digital camera 10. As described above, the television 200 is connected with the digital camera 10 in a wired manner, thereby acquiring the image data recorded in a nonvolatile internal recording device provided in the digital camera 10 or an external storage device inserted into the digital camera 10. The image data acquisition unit 206 is connected with the digital camera 10 in a wired manner, thereby functioning as a connection interface for acquiring the image data.

Further, the television 200 can acquire the image data recorded in the digital camera 10 by a wireless communication function utilizing infrared communication provided in the digital camera 10. Thus, the image data acquisition unit 206 can also function as an image data reception unit for acquiring the image data through the wireless connection with the digital camera 10 in this manner.

Moreover, the television 200 can also acquire the image data recorded in the recording medium by reading the recording medium recording therein the image data photographed by the digital camera 10. Therefore, the image data acquisition unit 206 can function as a recording medium reading unit including a recording medium mounting unit having a recording medium removable port. The recording medium readable by the image data acquisition unit 206 may employ, for example, a memory stick (registered trademark), SD card, DVD, CD or the like, but as long as it records therein the image data, it is not limited to a specific type of recording medium.

In this manner, the image data acquisition unit 206 is not limited to a specific image data acquiring method as long as it functions for acquiring the image data into the television 200 according to the present embodiment. The image data to be acquired is not limited to the data photographed by the digital camera 10. The image data may be image data saved in a personal computer, image data downloaded from the Internet, image data photographed by a cell phone or PDA having a photographing function, and the like as long as it is image data containing position information.

In this manner, the image data acquired by the image data acquisition unit 206 is transmitted to the storage unit 218 described later to be saved.

(Display Unit 208)

The display unit 208 is a display device made of a CRT (Cathode Ray Tube), a liquid crystal display, an organic EL (ElectroLuminescence) display or the like, for example. The display unit 208 can display predetermined contents such as predetermined program received from a broadcast station via an antenna (not shown) or image data recorded in the storage unit 218. The display unit 208 is controlled by the display control unit 209 described later to display predetermined contents and the like.

(Display Control Unit 209)

The display control unit 209 is configured with, for example, a CPU, a ROM, a RAM or the like, and each processing unit provided in the television 200 according to the present embodiment performs display control when displaying various data or information on the display unit 208. The display control unit 209 may refer to various parameters or databases recorded in the storage unit 218 or the like described later or may execute various programs recorded in the storage unit 218 or the like described later when performing the above processings.

Specifically, the display control unit 209 can display a list of image data recorded in the storage unit 218 on the display unit 208. Thus, the user can view the image data. Further, when the user selects the image data displayed on the display unit 208, the map image acquisition unit 212 described later can acquire the map information on the photographing location of the image data from the map information providing server 300. In this case, the display control unit 209 can display the image data on the display unit 208 to be overlapped on the map image acquired by the map image acquisition unit 212.

When the user selects the image data displayed on the display unit 208, the landmark information acquisition unit 214 described later can acquire the information associated with the landmarks present around the photographing location of the image data from the landmark information providing server 400. In this case, the display control unit 209 can display the landmark information acquired by the landmark information acquisition unit 214 on the display unit 208.

Further, when the user selects the landmark information displayed on the display unit 208, the associated image acquisition unit 216 described later can acquire the associated image associated with the landmark information from the image sharing server 500. In this case, the display control unit 209 can display the associated image acquire by the associated image acquisition unit 216 on the display unit 208 to be overlapped on the map image acquired by the map image acquisition unit 212.

There will be exemplified in the explanation of the processing flow described later a display example of the image data, the map image, the landmark information and the associated image displayed on the display unit 208 by the display control unit 209.

(Position Information Extraction Unit 210)

The position information extraction unit 210 is configured with, for example, a CPU, a ROM, a RAM or the like and extracts the position information contained in the image data recorded in the storage unit 218. As described above, the position information containing latitude/longitude representing the photographing location is recorded in the image data photographed by the digital camera 10 or the like having the photographing function with the GPS function. For example, when the user selects the image data displayed on the display unit 208, the position information extraction unit 210 can extract the position information contained in the image data. The position information extracted by the position information extraction unit 210 is transmitted by the map image acquisition unit 212, the landmark information acquisition unit 214 or the like described later via the communication control unit 202 to the map information providing server 300 or the landmark information providing server 400. A flow of the processing of extracting the position information by the position information extraction unit 210 or the processing of transmitting the extracted position information to each server will be described in the processing flow described later.

(Map Image Acquisition Unit 212)

The map image acquisition unit 212 is configured with, for example, a CPU, a ROM, a RAM or the like and acquires the map image from the map information providing server 300 connected thereto via the communication network 30.

Specifically, the map image acquisition unit 212 transmits a map image request signal for requesting a map image of the photographing location of the predetermined image data to the map information providing server 300 via the communication control unit 202. For example, when the user selects the image data displayed on the display unit 208, the map image acquisition unit 212 transmits the map image request signal to the map information providing server 300. At this time, the map image acquisition unit 212 transmits the map image request signal containing the position information extracted by the aforementioned position information extraction unit 210 to the map information providing server 300. In response thereto, the map information providing server 300 can transmit the map image corresponding to the latitude/longitude of the position information contained in the map image request signal to the television 200.

The map image acquisition unit 212 receives and records the map image transmitted from the map information providing server 300 in the storage unit 218 described later. Thus, the display control unit 209 can display the image data selected by the user on the display unit 208 to be overlapped on the map image recorded in the storage unit 218.

Further, the map image acquisition unit 212 may refer to various parameters or databases recorded in the storage unit 218 or the like described later or may execute various programs recorded in the storage unit 218 or the like described later in performing these processings. A flow of the processing of acquiring the map image by the map image acquisition unit 212 will be described in the processing flow described later.

(Landmark Information Acquisition Unit 214)

The landmark information acquisition unit 214 is configured with, for example, a CPU, a ROM, a RAM or the like and acquires the landmark information from the landmark information providing server 400 connected thereto via the communication network 30.

Specifically, the landmark information acquisition unit 214 transmits a landmark information request signal for requesting the information on the landmarks present around the photographing location of the predetermined image data to the landmark information providing server 400 via the communication control unit 202. For example, when the user selects the image data displayed on the display unit 208, the landmark information acquisition unit 214 transmits the landmark information request signal to the landmark information providing server 400. At this time, the landmark information acquisition unit 214 transmits the landmark information request signal containing the position information extracted by the aforementioned position information extraction unit 210 to the landmark information providing server 400. In response thereto, the landmark information providing server 400 can transmit the information associated with the landmarks present around the position corresponding to the latitude/longitude of the position information contained in the landmark information request signal to the television 200.

The landmark information acquisition unit 214 receives and records the landmark information transmitted from the landmark information providing server 400 in the storage unit 218 described later. Thus, the display control unit 209 can display the information on the landmarks present around the photographing location of the user-selected image data on the display unit 208.

Furthermore, the landmark information acquisition unit 214 may refer to various parameters or databases recorded in the storage unit 218 or the like described later or may execute various programs recorded in the storage unit 218 or the like described later in performing the above processings. A flow of the processing of acquiring the landmark information by the landmark information acquisition unit 214 will be described in the processing flow described later.

(Associated Image Acquisition Unit 216)

The associated image acquisition unit 216 is configured with, for example, a CPU, a ROM, a RAM or the like and acquires an associated image from the image sharing server 500 connected thereto via the communication network 30.

Specifically, the associated image acquisition unit 216 transmits an associated image request signal for requesting an image associated with a predetermined landmark to the image sharing server 500 via the communication control unit 202. For example, when the user selects the landmark information displayed on the display unit 208, the associated image acquisition unit 216 transmits the associated image request signal to the image sharing server 500. At this time, the associated image acquisition unit 216 transmits the associated image request signal containing the landmark information acquired by the aforementioned landmark information acquisition unit 214 to the image sharing server 500. In response thereto, the image sharing server 500 can transmit the image containing the landmark information as the tag information as the associated image to the television 200 based on the landmark information contained in the associated image request signal.

The associated image acquisition unit 216 receives and records the associated image transmitted from the image sharing server 500 in the storage unit 218 described later. Thus, the display control unit 209 can display the associated image with the user-selected landmark information on the display unit 208.

Moreover, the associated image acquisition unit 216 may refer to various parameters or databases recorded in the storage unit 218 or the like described later or may execute various programs recorded in the storage unit 218 or the like described later in performing the above processings. A flow of the processing of acquiring the associated image by the associated image acquisition unit 216 will be described in the processing flow described later.

(Storage Unit 218)

The storage unit 218 stores therein the image data acquired by the image data acquisition unit 206, the map images acquired by the map image acquisition unit 212, the landmark information acquired by the landmark information acquisition unit 214, the associated images acquired by the associated image acquisition unit 216, and the like.

The storage unit 218 may appropriately record therein various parameters or processing progressions which need to be saved when the television 200 according to the present embodiment performs certain processings, or various databases and the like. Further, the storage unit 218 can be freely read and written by the communication control unit 202, the operation unit 204, the image data acquisition unit 206, the display unit 208, the display control unit 209, the position information extraction unit 210, the map image acquisition unit 212, the landmark information acquisition unit 214, the associated image acquisition unit 216 and the like.

Heretofore, an example of the functional configuration of the television 200 according to the present embodiment has been shown. Note that each of they structural elements described above may be configured using a general-purpose material or circuit, or may be configured from hardware dedicated to the function of each structural element. Further, the function of each structural element may be entirely performed by a CPU or the like. Accordingly, the configuration to be used can be changed as appropriate according to the technical level at the time of carrying out the present embodiment.

(4. Functional Configuration of Map Information Providing Server 300)

Figure 3:
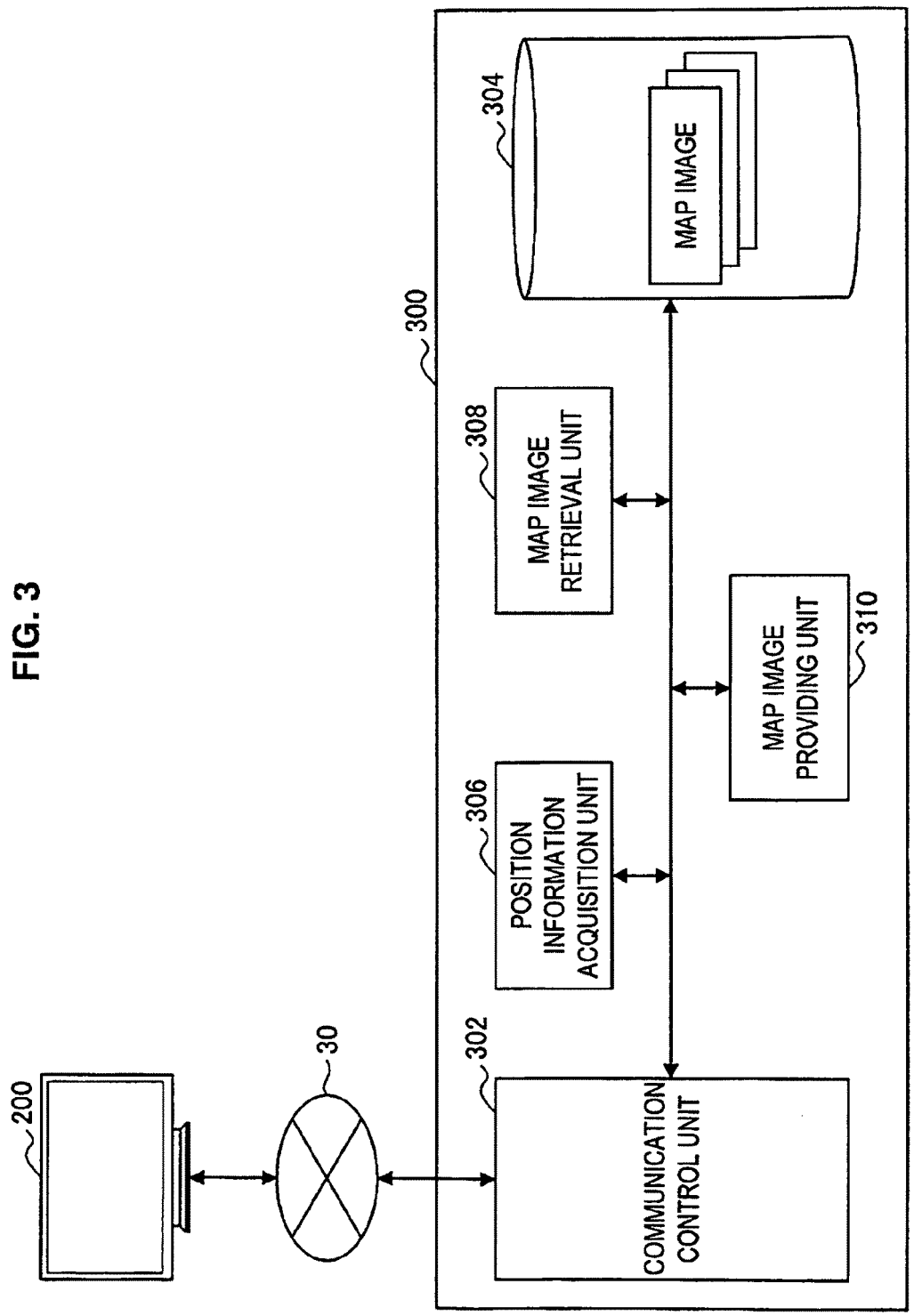
FIG. 3 is a block diagram showing a functional configuration of a map information providing server 300 according to the embodiment.

Next, a functional configuration of the map information providing server 300 according to the present embodiment will be described in detail. FIG. 3 is a block diagram showing the functional configuration of the map information providing server 300 according to the present embodiment.

As shown in FIG. 3, the map information providing server 300 is mainly constituted to include a communication control unit 302, a storage unit 304, a position information acquisition unit 306, a map image retrieval unit 308 and a map image providing unit 310. The functional configuration shown in FIG. 3 is one example of the functional configuration for realizing the characteristics of the map information providing server 300 according to the present embodiment described above and the present invention is not limited thereto. The map information providing server 300 according to the present embodiment can naturally include various functions provided in a typical information providing server such as operation unit, display control unit, information management function, system check function, setting function for various parameters. In the following, each functional configuration unit for realizing the characteristics of the map information providing server 300 according to the present embodiment will be described.

(Communication Control Unit 302)

The communication control unit 302 is configured with, for example, a CPU, a RAM, a communication device or the like and performs communication control of various data exchanged between the map information providing server 300 and the television 200.

Specifically, the communication control unit 302 receives a request from each processing unit provided in the map information providing server 300 according to the present embodiment and transmits various data or signals to the television 200. Further, the communication control unit 302 receives and transmits various data or signals transmitted from the television 200 to each processing unit provided in the map information providing server 300 according to the present embodiment.

Moreover, the communication control unit 302 can utilize the storage unit 304 described later as a transmission/reception buffer.

(Storage Unit 304)

The storage unit 304 records therein the map images managed by the map information providing server 300. The map image is an image in which a map of a predetermined range centering a predetermined latitude/longitude is expressed in a predetermined scaling size. All the map images recorded in the storage unit 304 relate to the map centering the position corresponding to the predetermined latitude/longitude. Therefore, the storage unit 304 records therein a plurality of map images associated with the values of the predetermined latitude/longitude. A map image desired by the user of the television 200 is retrieved by the map image retrieval unit 308 described later from among the plurality of the map images recorded in the storage unit 304 and is transmitted by the map image providing unit 310 described later via the communication control unit 302 to the television 200.

The predetermined range centering the predetermined latitude/longitude may be arbitrarily set or changed by the user of the television 200 or a administrator of the map information providing server 300, for example, and is not limited to a specific range. Further, the scaling size may be arbitrarily set or changed by the user of the television 200 or the administrator of the map information providing server 300 and is not limited to a specific scaling size. The storage unit 304 records therein the map images centering the predetermined latitude/longitude containing Japan and other foreign nations, which are not limited to the map images of specific locations.

The storage unit 304 may appropriately record therein various parameters or processing progressions which need to be saved when the map information providing, server 300 according to the present embodiment performs certain processings, or various databases and the like. The storage unit 304 can be freely read and written by the communication control unit 302, the position information acquisition unit 306, the map image retrieval unit 308, the map image providing unit 310 and the like.

(Position Information Acquisition Unit 306)

The position information acquisition unit 306 is configured with, for example, a CPU, a ROM, a RAM or the like and extracts the position information contained in the map image request signal transmitted from the television 200. As described above, the map image request signal transmitted from the television 200 contains the position information containing the values of the latitude/longitude. Therefore, when receiving the map image request signal from the television 200, the position information acquisition unit 306 can extract the position information contained in the map image request signal. Note that the position information extracted by the position information acquisition unit 306 is transferred to the map image retrieval unit 308 described later and is utilized for the retrieval of the map image requested by the television 200.

(Map Image Retrieval Unit 308)

The map image retrieval unit 308 is configured with, for example, a CPU, a ROM, a RAM or the like and retrieves a map image desired by the user utilizing the television 200 from among a plurality of map images recorded in the storage unit 304. In other words, the map image retrieval unit 308 retrieves the map image corresponding to the position information based on the position information extracted by the position information acquisition unit 306. As described above, the map images recorded in the storage unit 304 are corresponded to the values of predetermined latitude/longitude. Thus, the map image retrieval unit 308 can retrieve the map image corresponded to the value of latitude/longitude matching with (or approximating) the value of latitude/longitude contained in the position information extracted by the position information acquisition unit 306 from among the plurality of the map images recorded in the storage unit 304. The map image retrieved by the map image retrieval unit 308 is transferred to the map image providing unit 310 described later.

(Map Image Providing Unit 310)

The map image providing unit 310 is configured with, for example, a CPU, a ROM, a RAM or the like and transmits the map image retrieved by the map image retrieval unit 308 to the television 200. As described above, the map image retrieved by the map image retrieval unit 308 is transferred to the map image providing unit 310. In response thereto, the map image providing unit 310 transmits the transferred map image to the television 200 via the communication control unit 302.

Further, the storage unit 304 may record therein a plurality of map images for one value of latitude/longitude. For example, the map images having a plurality of scaling sizes and a plurality of image sizes may be recorded for the same value of latitude/longitude. In such a case, the map image providing unit 310 can select and transmit to the television 200 one arbitrary map image depending on a preset condition or the contents of the request signal from the television 200 from among the plurality of the map images retrieved by the map image retrieval unit 308. In this manner, when a plurality of map images corresponding to the same value of latitude/longitude are recorded in the storage unit 304, the aforementioned map image retrieval unit 308 may similarly select one arbitrary map image.

Heretofore, an example of the functional configuration of the map information providing server 300 according to the present embodiment has been shown. The map information providing server 300 has the above configuration so as to transmit the map image requested by the television 200 to the television 200. Note that each of the structural elements described above may be configured using a general-purpose materials or circuit, or may be configured from hardware dedicated to the function of each structural element. Further, the function of each structural element is entirely performed by a CPU or the like. Accordingly, the configuration to be used can be changed as appropriate according to the technical level at the time of carrying out the present embodiment.

(5. Functional Configuration of Landmark Information Providing Server 400)

Figure 4:
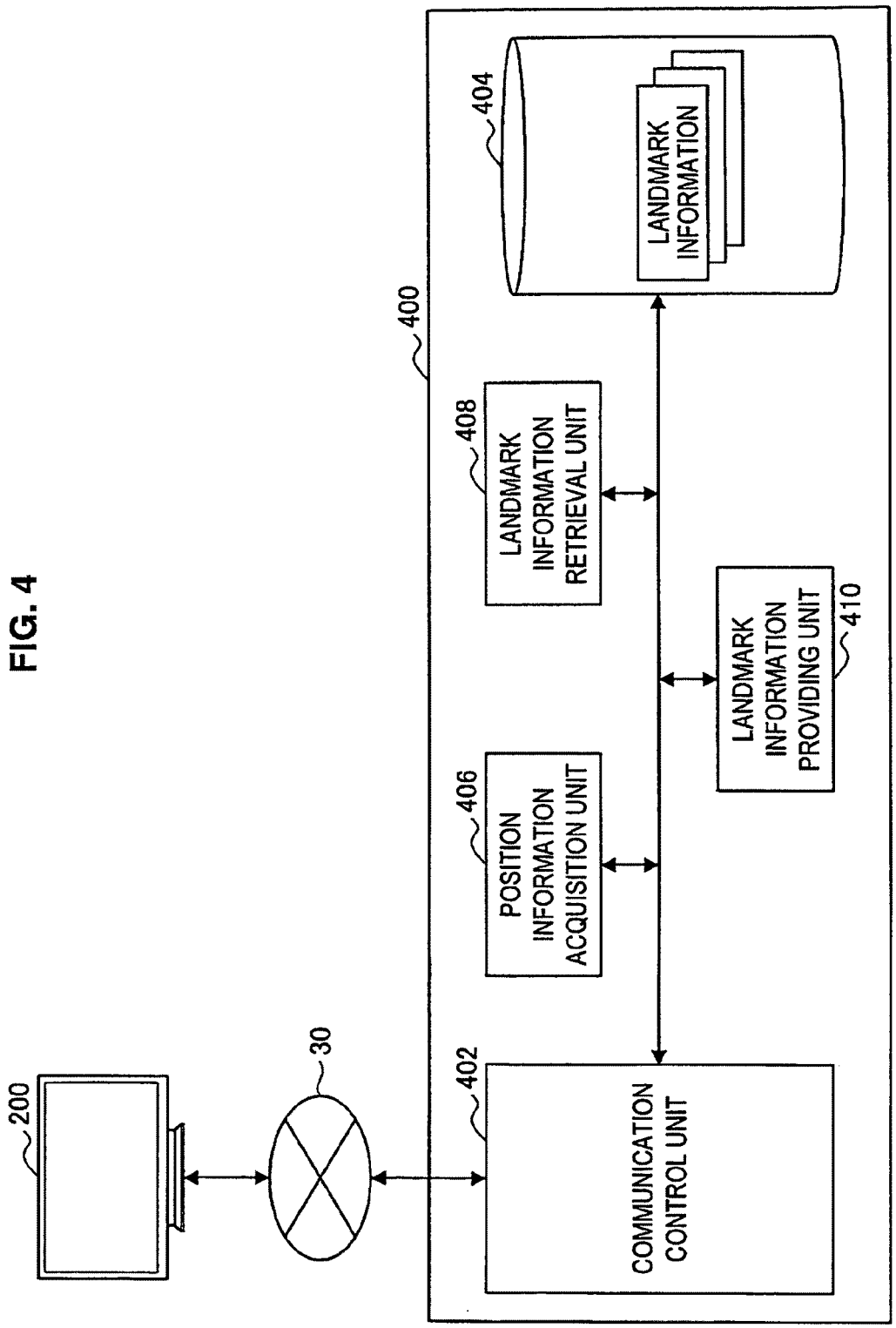
FIG. 4 is a block diagram showing a functional configuration of a landmark information providing server 400 according to the embodiment.

Next, a functional configuration of the landmark information providing server 400 according to the present embodiment will be described in detail. FIG. 4 is a block diagram showing the functional configuration of the landmark information providing server 400 according to the present embodiment.

As shown in FIG. 4, the landmark information providing server 400 is mainly constituted to include a communication control unit 402, a storage unit 404, a position information acquisition unit 406, a landmark information retrieval unit 408 and a landmark information providing unit 410. Note that the functional configuration shown in FIG. 4 shows one example of the functional configuration for realizing the characteristics of the landmark information providing server 400 according to the present embodiment described above and the present invention is not limited thereto. The landmark information providing server 400 according to the present embodiment can naturally include various functions provided in a typical information providing server such as operation unit, display control unit, information management function, system check function and setting function for various parameters. In the following, there will be described each functional configuration unit for realizing the characteristics of the landmark information providing server 400 according to the present embodiment.

(Communication Control Unit 402)

The communication control unit 402 is configured with, for example, a CPU, a RAM, a communication device or the like and performs communication control of various data exchanged between the landmark information providing server 400 and the television 200.

Specifically, the communication control unit 402 receives a request from each processing unit provided in the landmark information providing server 400 according to the present embodiment and transmits various data or signals to the television 200. Further, the communication control unit 402 receives and transmits various data or signals transmitted from the television 200 and transmits the same to each processing unit provided in the landmark information providing server 400 according to the present embodiment.

Further, the communication control unit 402 can utilize the storage unit 404 described later as a transmission/reception buffer.

(Storage Unit 404)

The storage unit 404 records therein landmark information managed by the landmark information providing server 400. Herin, the landmark information includes various information on predetermined landmarks, such as name of landmark, explanation of landmark, business hour of landmark and symbol mark image of landmark, and is not limited to specific information. The landmarks assume amusement park, zoo, theme park, tourist spot, station, air port, school and the like, for example, but are not limited to specific landmarks.

All the landmark information recorded in the storage unit 404 is associated with predetermined latitudes/longitudes. In other words, the landmark information contains the values of latitude/longitude corresponding to the addresses of the landmarks. The landmark information desired by the user of the television 200 is retrieved by the landmark information retrieval unit 408 described later from among a plurality of items of landmark information recorded in the storage unit 404 and is transmitted by the landmark information providing unit 410 described later via the communication control unit 402 to the television 200.

The storage unit 404 may appropriately record therein various parameters or processing progressions which need to be saved when the landmark information providing server 400 according to the present embodiment performs certain processings, or various databases and the like. Further, the storage unit 404 can be freely read and written by the communication control unit 402, the position information acquisition unit 406, the landmark information retrieval unit 408, the landmark information providing unit 410 and the like.

(Position Information Acquisition Unit 406)

The position information acquisition unit 406 is configured with, for example, a CPU, a ROM, a RAM or the like and extracts the position information contained in a landmark information request signal transmitted from the television 200. As described above, the landmark information request signal transmitted from the television 200 contains position information containing a value of latitude/longitude. Thus, when receiving the landmark information request signal from the television 200, the position information acquisition unit 406 can extract the position information contained in the landmark information request signal. Note that the position information extracted by the position information acquisition unit 406 is transferred to the landmark information retrieval unit 408 described later to be applied to retrieving the landmark information requested by the television 200.

(Landmark Information Retrieval Unit 408)

The landmark information retrieval unit 408 is configured with, for example, a CPU, a ROM, a RAM or the like and retrieves the landmark information desired by the user utilizing the television 200 from among a plurality of landmark information recorded in the storage unit 404. In other words, the landmark information retrieval unit 408 retrieves the landmark information on the landmarks present around the position corresponding to the position information based on the position information extracted by the position information acquisition unit 406. As described above, the landmark information recorded in the storage unit 404 is corresponded to a value of predetermined latitude/longitude. Therefore, the landmark information retrieval unit 408 can retrieve the landmark information which matches with the value of latitude/longitude contained in the position information extracted by the position information acquisition unit 406 or is corresponded to a value of latitude/longitude within a predetermined range from among the plurality of landmark information recorded in the storage unit 404.

Note that it is possible to arbitrarily set and change to what degree of the range the landmark is retrieved based on the latitude/longitude contained in the position information extracted by the position information acquisition unit 406. For example, a administrator of the landmark information providing server 400 can preset the range or the television 200 can contain the setting information in the landmark information request signal depending on the size of the map image displayed by the television 200. The landmark information retrieval unit 408 can retrieve the landmark information present within the setting range based on the latitude/longitude contained in the extracted position information based on the range set by the manager or the range set by the landmark information request signal.

The landmark information retrieved by the landmark information retrieval unit 408 is transferred to the landmark information providing unit 410 described later.

(Landmark Information Providing Server 410)

The landmark information providing unit 410 is configured with, for example, a CPU, a ROM, a RAM or the like and transmits the landmark information retrieved by the landmark information retrieval unit 408 to the television 200. As described above, the landmark information retrieved by the landmark information retrieval unit 408 is transferred to the landmark information providing unit 410. In response thereto, the landmark information providing unit 410 transmits the transferred landmark information to the television 200 via the communication control unit 402.

Heretofore, an example of the functional configuration of the landmark information providing server 400 according to the present embodiment has been shown. The landmark information providing server 400 has the above configuration so as to transmit the landmark information requested by the television 200 to the television 200. Note that each of the structural elements described above may be configured using a general-purpose material or circuit, or may be configured from hardware dedicated to the function of each structural elements. Further, the function of each structural element may be entirely performed by a CPU or the like. Accordingly, the configuration to be used can be changed as appropriate according to the technical level at the time of carrying out the present embodiment.

(6. Functional Configuration of Image Sharing Server 500)

Figure 5:
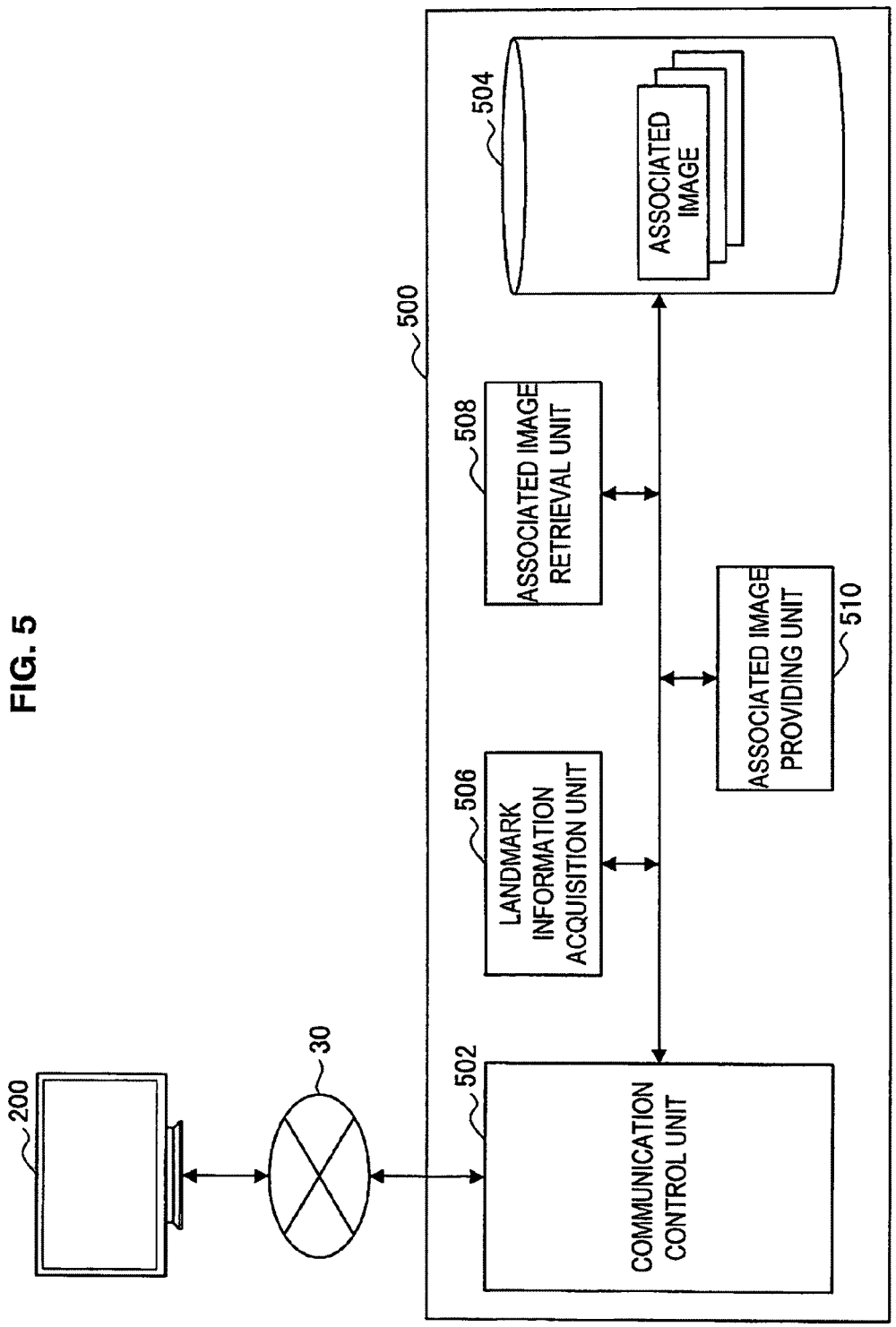
FIG. 5 is a block diagram showing a functional configuration of an image sharing server 500 according to the embodiment.

Next, a functional configuration of the image sharing server 500 according to the present embodiment will be described in detail. FIG. 5 is a block diagram showing the functional configuration of the image sharing server 500 according to the present embodiment.

As shown in FIG. 5, the image sharing server 500 is mainly constituted to include a communication control unit 502, a storage unit 504, a landmark information acquisition unit 506, an associated image retrieval unit 508 and an associated image providing unit 510. Note that the functional configuration shown in FIG. 5 shows one example of the functional configuration for realizing the characteristics of the image sharing server 500 according to the aforementioned present embodiment and the present invention is not limited thereto. The image sharing server 500 according to the present embodiment can naturally include various functions provided in a typical information providing server such as operation unit, display control unit, information management function, system check function and setting function for various parameters. In the following, each functional configuration unit for realizing the characteristics of the image sharing, server 500 according to the present embodiment will be described.

(Communication Control Unit 502)

The communication control unit 502 is configured with, for example, a CPU, a RAM, a communication device or the like and performs communication control of various data exchanged between the image sharing server 500 and the television 200.

Specifically, the communication control unit 502 receives a request from each processing unit provided in the image sharing server 500 according to the present embodiment and transmits various data or signals to the television 200. The communication control unit 502 receives and transmits various data or signals transmitted from the television 200 to each processing unit provided in the image sharing server 500 according to the present embodiment.

The communication control unit 502 can utilize the storage unit 504 described later as a transmission/reception buffer.

(Storage Unit 504)

The storage unit 504 records therein various image data managed by the image sharing server 500. As described above, the image sharing server 500 is a server for providing a service of publicizing the images photographed by the user over the Internet. Thus, the storage unit 504 records therein various image data to be publicized over the Internet.

Herein, arbitrary keywords such as location, person, genre, landmark, photographing date and event are added as the tag information to the image data recorded in the storage unit 504. For example, the image data photographed by the digital camera is saved in the EXIF format as image file standard for digital camera, and records therein the position information such as latitude/longitude of the GPS. Further, the user can add arbitrary keywords such as location, person, genre, landmark and photographing date as the tag information when uploading the image through the image publicizing service over the Internet provided by the image sharing server 500. Thus, the user can easily retrieve the desired image data based on arbitrary tag information in the image publicizing service over the Internet provided by the image sharing server 500.

The image data desired by the user of the television 200 is retrieved by the associated image retrieval unit 508 described later from among a plurality of image data recorded in the storage unit 504 and is transmitted by the associated image providing unit 510 described later via the communication control unit 502 to the television 200.

Note that the storage unit 504 may appropriately record therein various parameters or processing progressions which need to be saved when the image sharing server 500 according to the present embodiment performs certain processings, or various databases and the like. Further, the storage unit 504 can be freely read and written by the communication control unit 502, the landmark information acquisition unit 506, the associated image retrieval unit 508, the associated image providing unit 510 and the like.

(Landmark Information Acquisition Unit 506)

The landmark information acquisition unit 506 is configured with, a CPU, a ROM, a RAM or the like and extracts the landmark information contained in an associated image request signal transmitted from the television 200. As described above, the associated image request signal transmitted from the television 200 contains the landmark information. Therefore, when receiving the associated image request signal from the television 200, the landmark information acquisition unit 506 can extract the landmark information contained in the associated image request signal. Note that the landmark information extracted by the landmark information acquisition unit 506 is transferred to the associated image retrieval unit 508 described later and is applied to retrieving the associated image requested by the television 200.

(Associated Image Retrieval Unit 508)

The associated image retrieval unit 508 is configured with, for example, a CPU, a ROM, a RAM or the like and retrieves the image data desired by the user utilizing the television 200 from among a plurality of image data recorded in the storage unit 504. In other words, the associated image retrieval unit 508 retrieves the image data containing the landmark information as the tag information based on the landmark information extracted by the landmark information acquisition unit 506. As described above, the associated image recorded in the storage unit 504 is added with the tag information containing predetermined keywords such as name of landmark. Thus, the associated image retrieval unit 508 can retrieve the image data containing the name of landmark contained in the landmark information extracted by the landmark information acquisition unit 506 as the tag information from among the plurality of image data recorded in the storage unit 504.

The image data retrieved by the associated image retrieval unit 508 is transferred to the associated image providing unit 510 described later.

(Associated Image Providing Unit 510)

The associated image providing unit 510 is configured with, for example, a CPU, a ROM, a RAM or the like and transmits the image data retrieved by the associated image retrieval unit 508 to the television 200. As described above, the image data retrieved by the associated image retrieval unit 508 is transferred to the associated image providing unit 510. In response thereto, the associated image providing unit 510 transmits the transferred image data as the associated image to the television 200 via the communication control unit 502.

There has been described above one example of the functional configuration of the image sharing server 500 according to the present embodiment. The image sharing server 500 has the above configuration so as to transmit the associated image requested by the television 200 to the television 200. Note that each constituent described above may be configured with a general purpose member or circuit or may be configured in hardware specific to the function of each constituent. The function of each constituent may be entirely performed by the CPU or the like. Thus, the configuration to be utilized may be appropriately changed depending on a technical level when the present embodiment is performed.

(7. Image Processing Flow and Display Example)

Figure 6:
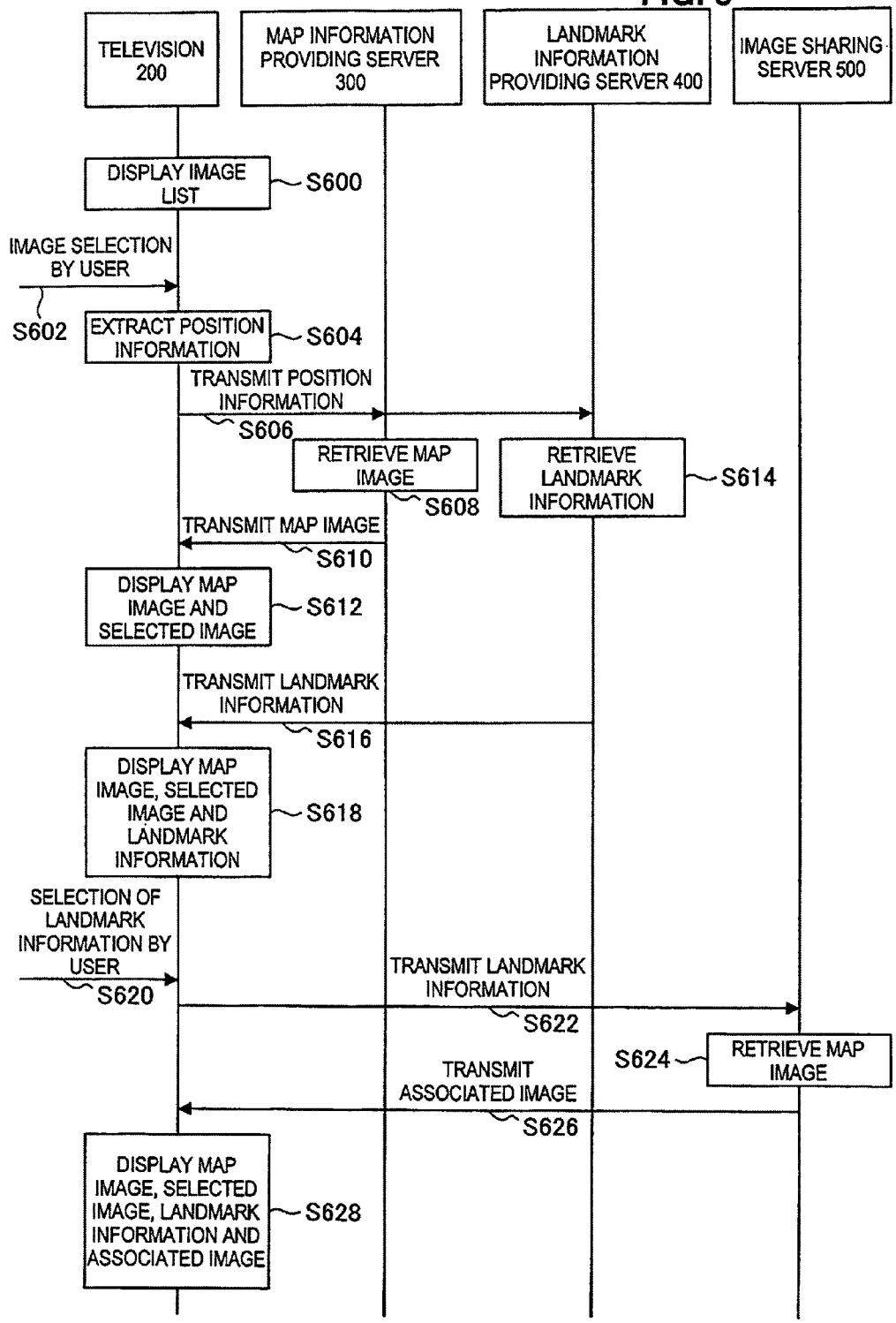
FIG. 6 is an explanatory diagram showing a flow of an information processing in the image processing system 100 according to the embodiment.

Next, there will be described a flow of an information processing by the image processing system 100 being constituted to include the television 200, the map information providing server 300, the landmark information providing server 400 and the image sharing server 500 as configured above along with a display example of the television 200. FIG. 6 is a flow diagram showing a flow of the processing in which the television 200 acquires and displays various information and associated images from each server on the display unit 208 in the image processing system 100 according to the present embodiment.

As shown in FIG. 6, the television 200 displays a list of image data recorded in the storage unit 218 on the display unit 208 in step 600. For example, when the operation unit 204 receives an instruction from the user, the television 200 can display the list of image data.

Figure 7:
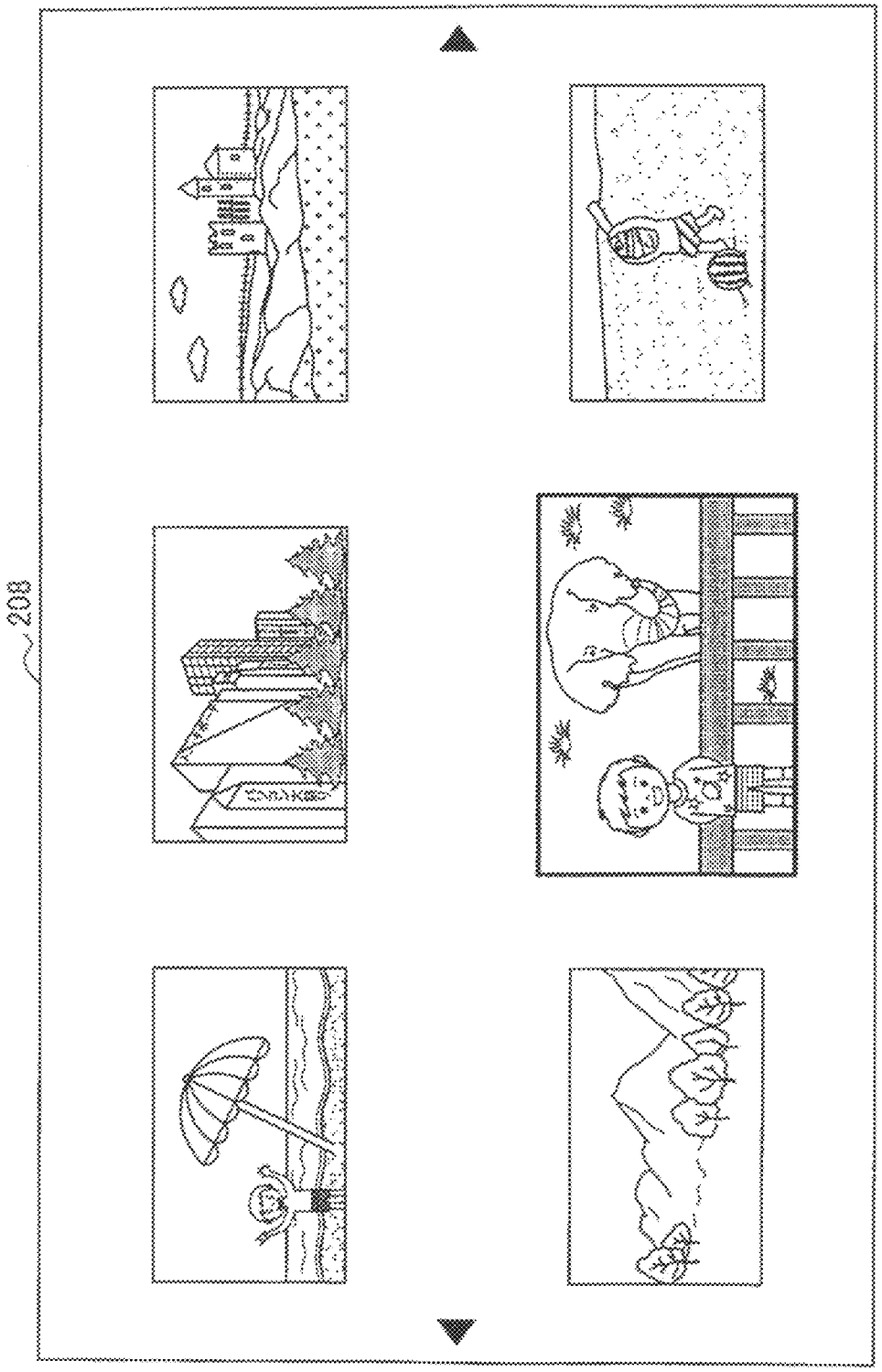
FIG. 7 is an explanatory diagram showing a display example of a list of image data on a display unit 208 of the television 200 according to the embodiment.

FIG. 7 is an explanatory diagram showing one example of the display unit 208 on which the list of image data recorded in the storage unit 218 is displayed. With reference to FIG. 7, it can be seen that the display unit 208 displays thereon a plurality of image data recorded in the storage unit 218. Note that FIG. 7 shows one example for displaying the list of image data, and the number of items of image data, display position, size and the like, which are to be displayed on the display unit 208, are not limited thereto.

Next, in step 602, the user selects arbitrary image data from the list of image data displayed on the display unit 208. The television 200 can receive a selection instruction from the user by the operation unit 204, for example. In the following explanation, there will be described a processing when image data of a zoo, displayed at the lower center, is selected from among the list of image data shown in FIG. 7.

Next, in step 604, the television 200 extracts the position information contained in the image data selected by the user in step 602. As described above, the position information containing the latitude/longitude is recorded in the image data recorded in the storage unit 218. Thus, the position information extraction unit 210 provided in the television 200 can extract the position information contained in the image data selected by the user.

Thereafter, in step 606, the television 200 transmits the position information extracted in step 604 to the map information providing server 300 and the landmark information providing server 400. As described above, the television 200 according to the present embodiment can simultaneously display the map image on the photographing location of the user-selected image data or the information on the landmarks present around the photographing location and the image data.

Specifically, when predetermined image data is selected by the user, the map image acquisition unit 212 provided in the television 200 transmits a map image request signal to the map information providing server 300. At this time, the map image acquisition unit 212 transmits the map image request signal containing the position information extracted in step 604 to the map information providing server 300. Further, the landmark information acquisition unit 214 provided in the television 200 transmits a landmark information request signal to the landmark information providing server 400. At this time, the landmark information acquisition unit 214 transmits the landmark information request signal containing the landmark information extracted in step 604 to the landmark information providing server 400.

In response thereto, the map information providing server 300 retrieves the map image requested by the television 200 in step 608. In the map information providing server 300, the position information acquisition unit 306 first extracts the position information contained in the map image request signal transmitted from the television 200. Thereafter, the map image retrieval unit 308 retrieves the map image requested by the television 200 from among a plurality of map images recorded in the storage unit 304 based on the value of latitude/longitude contained in the extracted position information.

Thereafter, in step 610, the map information providing server 300 transmits the map image retrieved in step 608 to the television 200. Note that the processing in step 610 is performed by the map image providing unit 310 provided in the map information providing server 300.

In response thereto, the television 200 displays the map image transmitted from the map information providing server 300 and the image data selected by the user to be overlapped on the display unit 208 in step 612. For example, the display control unit 209 provided in the television 200 can control to display the image data on the display unit 208 to be overlapped on the position corresponding to the latitude/longitude contained in the user-selected image data within the map image.

Figure 8:
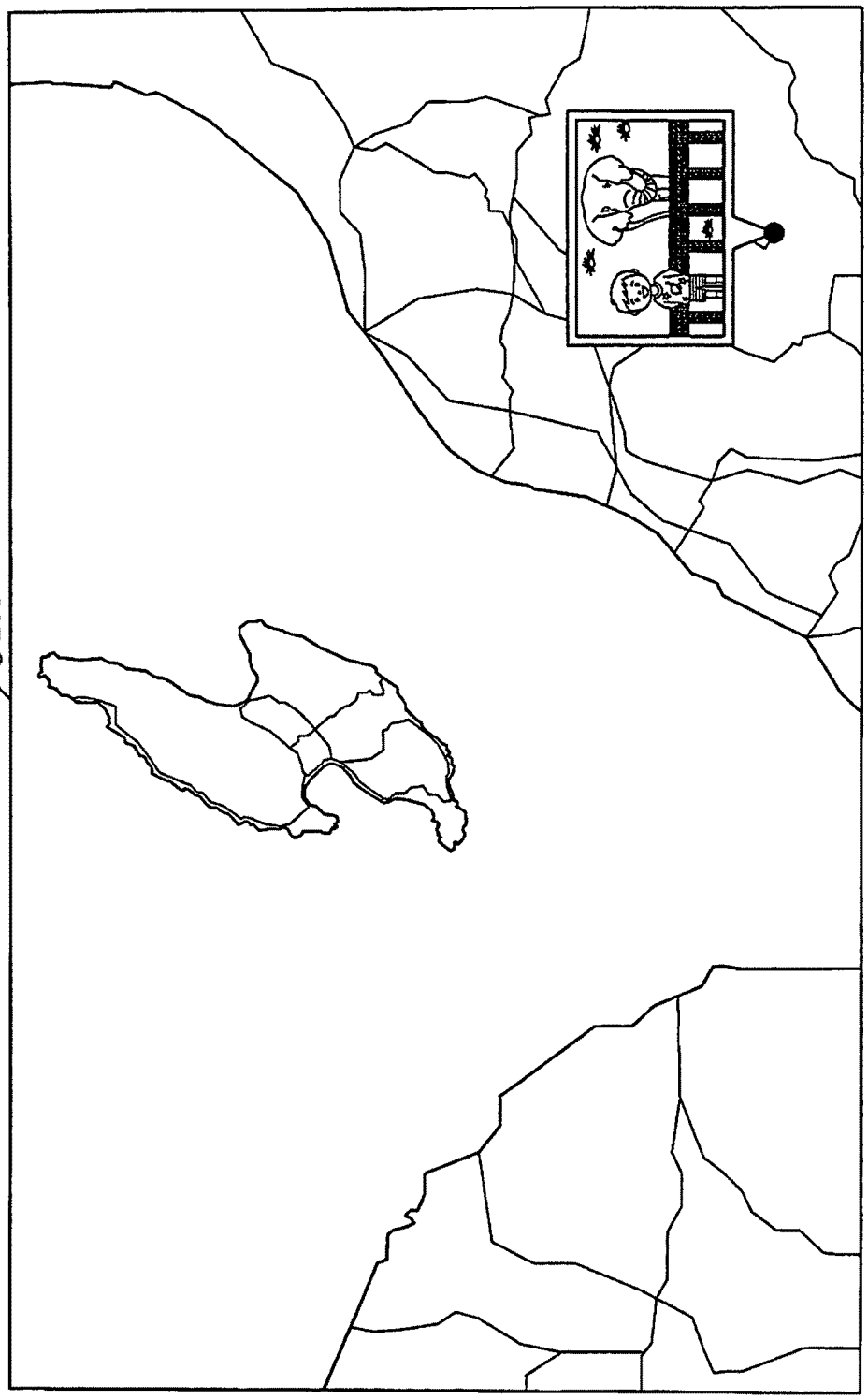
FIG. 8 is an explanatory diagram showing a display example of image data and a map image on the display unit 208 of the television 200 according to the embodiment.

FIG. 8 is an explanatory diagram showing one example of the display unit 208 for displaying the map image and the user-selected image data in step 612. With reference to FIG. 8, it can be seen that the user-selected image of the zoo is displayed together with the map image containing the address of the zoo. Thus, the user can view the selected image data while confirming the map of the photographing location, and can enjoy the memory of the travel destination. FIG. 8 shows a display example of the display unit 208, and a size of map image, scaling, a display size of image data and the like are not limited thereto.

With reference to FIG. 6 again, the landmark information providing server 400 which has received the position information in step 606 retrieves the landmark information requested by the television 200 in step 614. In the landmark information providing server 400, at first, the position information acquisition unit 406 extracts the position information contained in the landmark information request signal transmitted from the television 200. Thereafter, the landmark information retrieval unit 408 retrieves the landmark information requested by the television 200 based on the value of latitude/longitude contained in the extracted position information from among a plurality of landmark information recorded in the storage unit 404.

Thereafter, in step 616, the landmark information providing server 400 transmits the landmark information retrieved in step 614 to the television 200. The processing in step 616 is performed by the landmark information providing unit 410 provided in the landmark information providing server 400.

In response thereto, in step 618, the television 200 displays the landmark information transmitted from the landmark information providing server 400 together with the image displayed in step 612 on the display unit 208. The display control unit 209 provided in the television 200 can control to display, within the map image, for example, the symbols/icons/names representing the presence of the landmarks at the positions corresponding to the values of latitude/longitude contained in the landmark information transmitted from the landmark information providing server 400.

Figure 9:
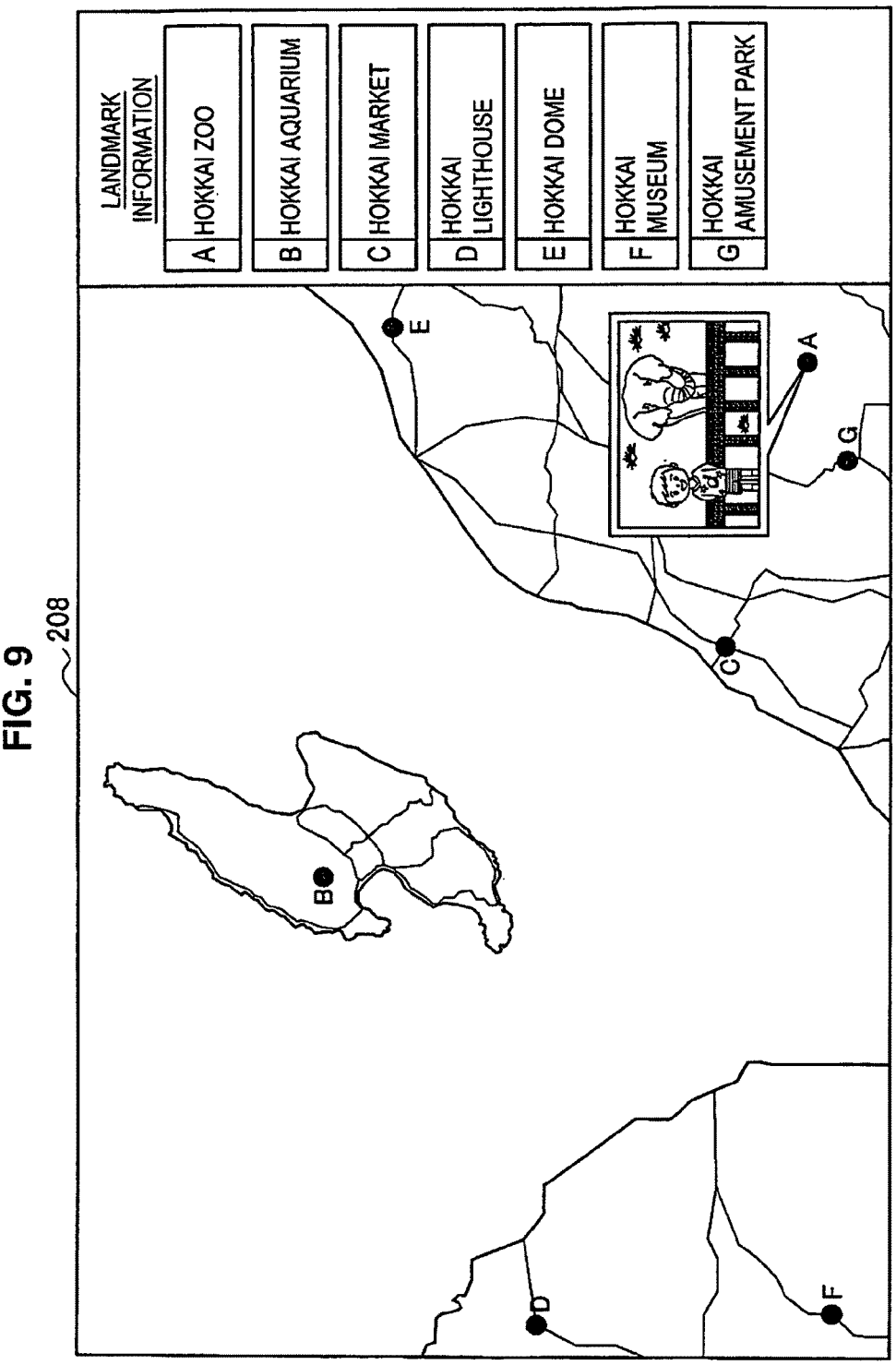
FIG. 9 is an explanatory diagram showing a display example of image data, map image and landmark information on the display unit 208 of the television 200 according to the embodiment.

FIG. 9 is an explanatory diagram showing one example of the display unit 208 for displaying the map image, the user-selected image data and the landmark information in step 618. With reference to FIG. 9, it can be seen that the marks (symbols) representing the presence of the landmarks are displayed at the positions where the landmarks are present on the map image containing the address of the user-selected zoo. Further, the names of the landmarks corresponding to the marks (symbols) are displayed as a list at the right side of the display unit 208. Thus, the user can not only view the map of the photographing location of the selected image data, but also recognize the information on the landmarks present around the photographing location and enjoy the memory of the travel destination.

Note that FIG. 9 shows a display example of the display unit 208, and a size of map image, scaling, a display size of image data, a kind of landmark information, a displaying method of landmark information and the like are not limited thereto. For example, in FIG. 9, the symbols are given on the map image and the names of the landmarks corresponding to the marks are display in another display frame, but the names of the landmarks may be directly displayed on the map image. Further, the kinds of the landmarks to be displayed may be arbitrarily filtered. For example, the kinds of the landmarks to be displayed are preset so that the display control unit 209 can control to display only the kinds of landmark information that have been set on the display unit 208 from among a plurality of landmark information transmitted from the landmark information providing server 400. Thus, the user can display and view only the amusement park present around the selected image data on the map image, for example.

With reference to FIG. 6 again, in step 620, the user selects arbitrary landmark information from among the landmark information displayed on the display unit 208. The television 200 can receive, for example, a selection instruction from the user by the operation unit 204.

Next, in step 622, the television 200 transmits the landmark information selected by the user in step 620 to the image sharing server 500. As described above, the television 200 according to the present embodiment can acquire and display the image associated with the landmark present around the photographing location of the user-selected image data from the image sharing server 500 for providing the image sharing service over the Internet.

Therefore, when the user selects predetermined landmark information, the associated image acquisition unit 216 provided in the television 200 transmits an associated image request signal to the image sharing server 500. At this time, the associated image acquisition unit 216 transmits the associated image request signal containing the landmark information selected in step 620 to the image sharing server 500.

In response thereto, the image sharing server 500 retrieves the associated image requested by the television 200 in step 624. In the image sharing server 500, at first, the landmark information acquisition unit 506 extracts the landmark information contained in the associated image request signal transmitted from the television 200. Thereafter, the associated image retrieval unit 508 retrieves the image data requested by the television 200 from among a plurality of image data recorded in the storage unit 504 based on the extracted landmark information. In other words, the associated image retrieval unit 508 compares the extracted landmark information with the landmark information contained in the tag information of the image data recorded in the storage unit 504 and retrieves only the image data with which the landmark information coincides.

Thereafter, in step 626, the image sharing server 500 transmits the image data retrieved in step 624 as the associated image to the television 200. Note that the processing in step 626 is performed by the associated image providing unit 510 provided in the image sharing server 500.

In response thereto, the television 200 displays the associated image transmitted from the image sharing server 500 together with the image displayed in step 618 on the display unit 208 in step 628. The display control unit 209 provided in the television 200, for example, can control to display the associated image on the display unit 208 to be overlapped on the position corresponding to the address of the landmark corresponding to the associated image transmitted from the image sharing server 500 within the map image. Further, when a plurality of associated images is received from the image sharing server 500, each image may be sequentially displayed or a predetermined number of images may be displayed simultaneously.

Figure 10:
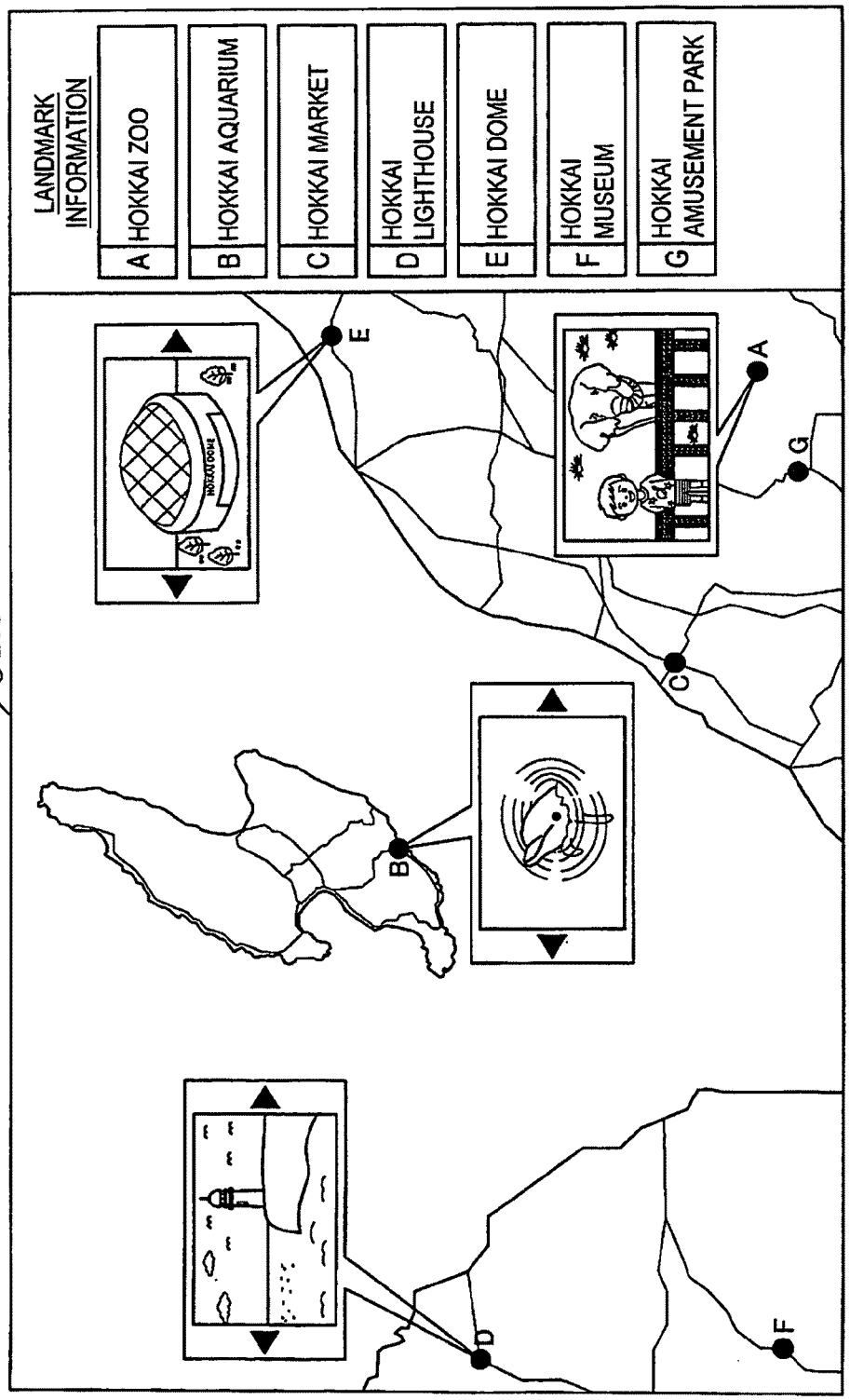
FIG. 10 is an explanatory diagram showing a display example of image data, map image, landmark information and associated images on the display unit 208 of the television 200 according to the embodiment.

FIG. 10 is an explanatory diagram showing one example of the display unit 208 for displaying a map image, user-selected image data, landmark information, and associated images of user-selected landmarks in step 628. Note that FIG. 10 is a display example when "Hokkai aquarium: B", "Hokkai lighthouse: C" and "Hokkai dome: E" are selected by the user. With reference to FIG. 10, it can be seen that the associated images are displayed at the positions where the user-selected landmarks are present. Thus, the user can not only view the map of the photographing location of the selected image data or the information on the landmarks present therearound but also view various images associated with the landmarks. Consequently, it is possible to view and save the images of the landmarks which the user could not photograph at a travel destination, or enjoy the memory of the travel destination.

FIG. 10 shows a display example of the display unit 208, and a size of map image, scaling, a display size of image data, a kind of landmark information, a landmark information displaying method, an associated image displaying method and the like are not limited thereto. For example, FIG. 10 shows the images associated with the landmarks to be overlapped on the addresses of the landmarks on the map image, but the associated images may be displayed in another display frame.

Further, in displaying the associated image, the display control unit 209 can display the associated image on the display unit 208 in various manners by previously storing the display method and the like as the setting information. For example, the image data photographed by the digital camera 10 or the like typically records therein the information on the photographing date. The display control unit 209 can compare the photographing date of the image selected in step 602 with the photographing date of the associated image transmitted from the image sharing server 500 in step 626 to display only the associated image photographed on a date within a preset range. Thus, the user can view and acquire the image of the landmark present around the photographing location which has been photographed at the same date as when the selected image was photographed. Further, the display control unit 209 can display the associated images in the order of photographing date and time in the display of the associated images in step 628.

In the processing flow shown in FIG. 6, only the associated image of the landmark information selected by the user in step 620 is displayed on the display unit 208 in step 626, but the present invention is not limited thereto. For example, the processing in step 620 can be omitted to automatically add all the landmark information transmitted from the landmark information providing server 400 in step 616 into the associated image request signal and transmit to the image sharing server 500 in step 622. Thus, the user can view the map image relating to the photographing location of the image, the information on the landmarks present around the photographing location and the images associated with the landmarks only by selecting arbitrary image data in step 620.

There has been described above the flow of the processing in the image processing system 100 according to the present embodiment. In this manner, in the image processing system 100 according to the present embodiment, various services relating to the photographed images over the network can be efficiently utilized based on the position information recorded in the photographed images. In other words, the television 200 according to the present embodiment can acquire the map image relating to the photographing location of the photographed image from the map information providing server 300 for providing various map information over the network based on the position information contained in the photographed image. The television 200 can acquire the information on the landmarks present around the photographing location of the photographed image from the landmark information providing server 400 for providing various landmark information over the network based on the position information contained in the photographed image. Further, the television 200 can acquire the image relating to the landmark from the image sharing server 500 for publicizing various images over the network based on the landmark information acquired from the landmark information providing server 400. Consequently, the user can not only view the images photographed at a travel destination but also view the map image of the photographing location, the information on the landmarks present therearound, the images relating to the landmarks and the like and enjoy the memory of the travel destination.

(8. Variants)

The television 200 according to the present embodiment described above additionally includes various functional configurations so that further different effects can be obtained in addition to the above functions. In the following, there will be described a variant of the television 200 having more functional configurations than the aforementioned television 200.

The television 200 according to the aforementioned embodiment was able to acquire and display the associated images from the image sharing server 500. The image sharing server 500 is directed for providing the image sharing service for publicizing various images over the Internet. The user can not only download and acquire the image data publicized by the image sharing server 500 but also upload and publicize his/her own image data over the Internet. When uploading the images, the user can add arbitrary keywords such as location, person, genre, landmark and photographing date as the tag information. The television 200 according to the variant is characterized by being capable of adding the landmark information acquired from the landmark information providing server 400 as the tag information into the user-selected image data and uploading to the image sharing server 500.

Figure 11:
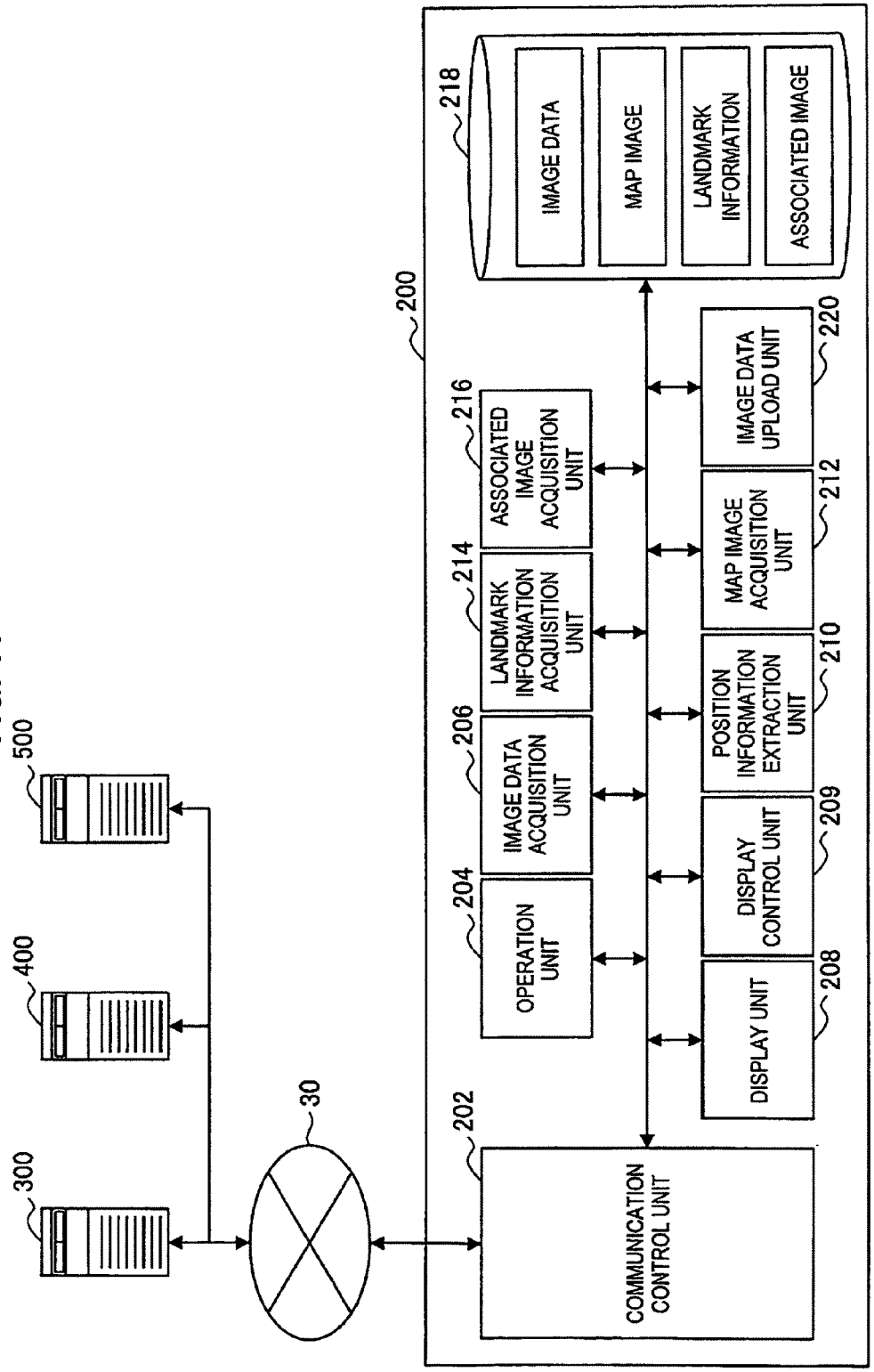
FIG. 11 is a block diagram showing a functional configuration of the television 200 according to a variant of the embodiment.

FIG. 11 is a block diagram showing one example of the functional configuration of the television 200 according to the variant. As shown in FIG. 11, the television 200 is constituted to include an image data upload unit 220 in addition to the functional configurations of the aforementioned embodiment. In the following, the image data upload unit 220 as characteristic part of the variant will be described.

The image data upload unit 220 is configured with, for example, a CPU, a ROM, a RAM or the like and uploads predetermined image data to the image sharing service provided by the image sharing server 500 connected thereto via the communication network 30.

Specifically, the image data upload unit 220 adds the landmark information acquired by the landmark information acquisition unit 214 as the tag information to the predetermined image data. Further, the image data upload unit 220 transmits the image data added with the landmark information to the image sharing server 500 via the communication control unit 202. For example, when the user selects the image data displayed on the display unit 208, the image data upload unit 220 transmits an upload request signal for publicizing the image data over the Internet to the image sharing server 500. At this time, the image data upload unit 220 adds the landmark information acquired by the landmark information acquisition unit 214 to the image data, includes into the upload request signal, and transmits to the image sharing server 500. In response thereto, the image sharing server 500 can publicize the image data contained in the upload request signal over the Internet.

Figure 12:
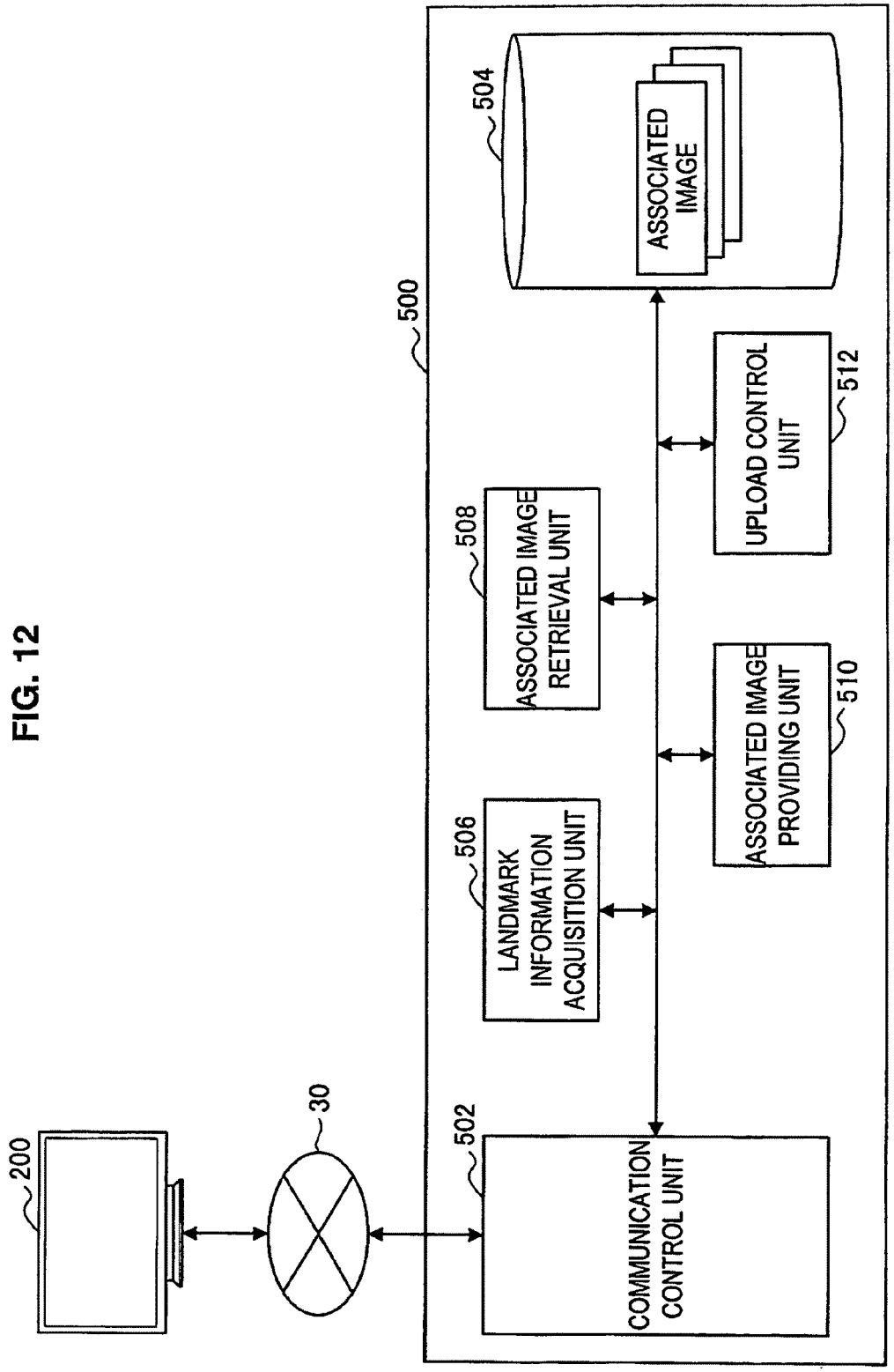
FIG. 12 is a block diagram showing a functional configuration of an image sharing server 500 according to a variant of the embodiment.

FIG. 12 is a block diagram showing one example of the functional configuration of the image sharing server 500 for realizing the image processing system according to the variant. As shown in FIG. 12, the image sharing server 500 includes an upload control unit 512 in addition to the functional configurations according to the aforementioned embodiment. In the following, the upload control unit 512 as characteristic part of the image sharing server 500 will be described.

The upload control unit 512 is configured with, for example, a CPU, a ROM, a RAM or the like and records the image data contained in the upload request signal transmitted from the television 200 in the storage unit 218 for publicizing the image over the Internet. As described above, the upload request signal transmitted from the television 200 contains the image data containing the landmark information as the tag information. Therefore, the landmark information is recorded as the tag information in the image data to be publicized with the image sharing service over the Internet by the upload control unit 512. Thus, if the image data is retrieved based on the landmark information with the image sharing service over the Internet provided by the image sharing server 500, it means that the image data transmitted by the television 200 will be retrieved. In this manner, the user utilizing the television 200 can automatically add the landmark information to his/her photographed image data for publicizing the same over the Internet.

Figure 13:
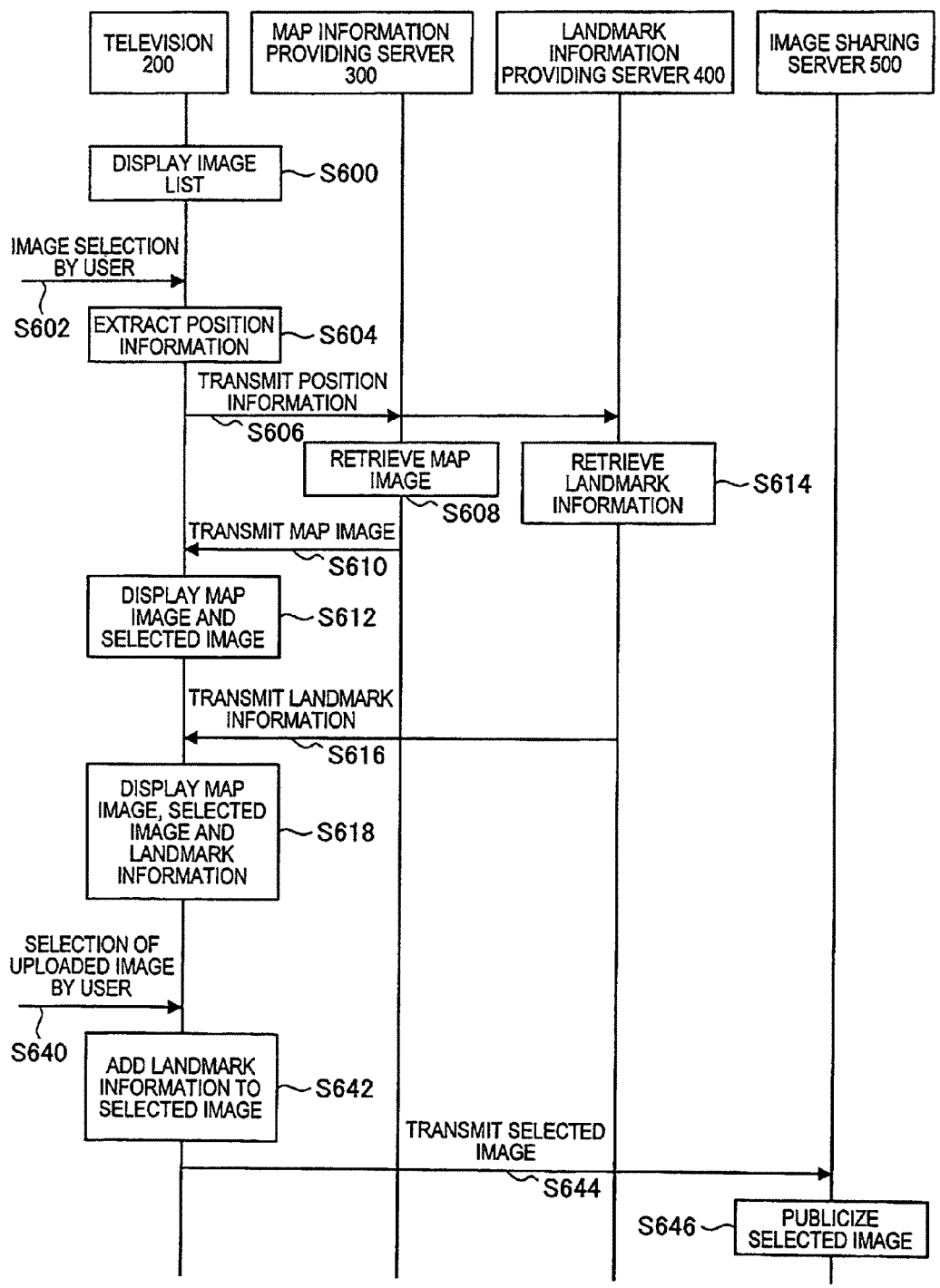
FIG. 13 is an explanatory diagram showing a flow of an information processing in the image processing system 100 according to a variant of the embodiment.

FIG. 13 is an explanatory diagram showing a flow of the processing of uploading the user-selected image data to the image sharing service over the Internet provided by the image sharing server 500 by the television 200. The processing from step 600 to step 618 is similar to the processing shown in FIG. 6 and is thus omitted here.

In step 640, the user selects the image data displayed on the display unit 208 as the image data to be publicized over the Internet. For example, the television 200 can receive a selection instruction from the user by the operation unit 204.

Next, in step 642, the television 200 adds the landmark information transmitted from the landmark information providing server 400 in step 616 as the tag information to the image data selected by the user in step 640.

Thereafter, in step 644, the television 200 transmits the upload request signal containing the image data added with the landmark information to the image sharing server 500. The processing in step 642 and step 644 is performed by the image data upload unit 220 provided in the television 200.

In response thereto, the image sharing server 500 publicizes the image data transmitted from the television 200 with the image sharing service over the Internet in step 646. In the image sharing server 500, at first, the upload control unit 512 extracts the image date contained in the upload request signal transmitted from the television 200 and records it in the storage unit 504. Thereafter, the upload control unit 512 publicizes the image data recorded in the storage unit 504 with the image sharing service provided over the Internet.

There has been described above the variant of the television 200 capable of adding the landmark information to the photographed image and publicizing with the image sharing service over the Internet. In this manner, the television 200 according to the variant can efficiently utilize various services relating to the photographed images over the network based on the position information recorded in the photographed images. In other words, the television 200 can acquire the information on the landmarks present around the photographing location of the photographed image from the landmark information providing server 400 for providing various items of landmark information over the network based on the position information contained in the photographed image. Further, the television 200 can add the landmark information acquired from the landmark information providing server 400 to the image data, and upload so as to publicize the image data with the image sharing service provided over the Internet. As a result, the user can not only view the images photographed at a travel destination but also add the information on the photographing location (landmark) as the tag information and publicize the image data over the Internet.

(9. Hardware Configuration of Image Processing Apparatus)

Figure 14:
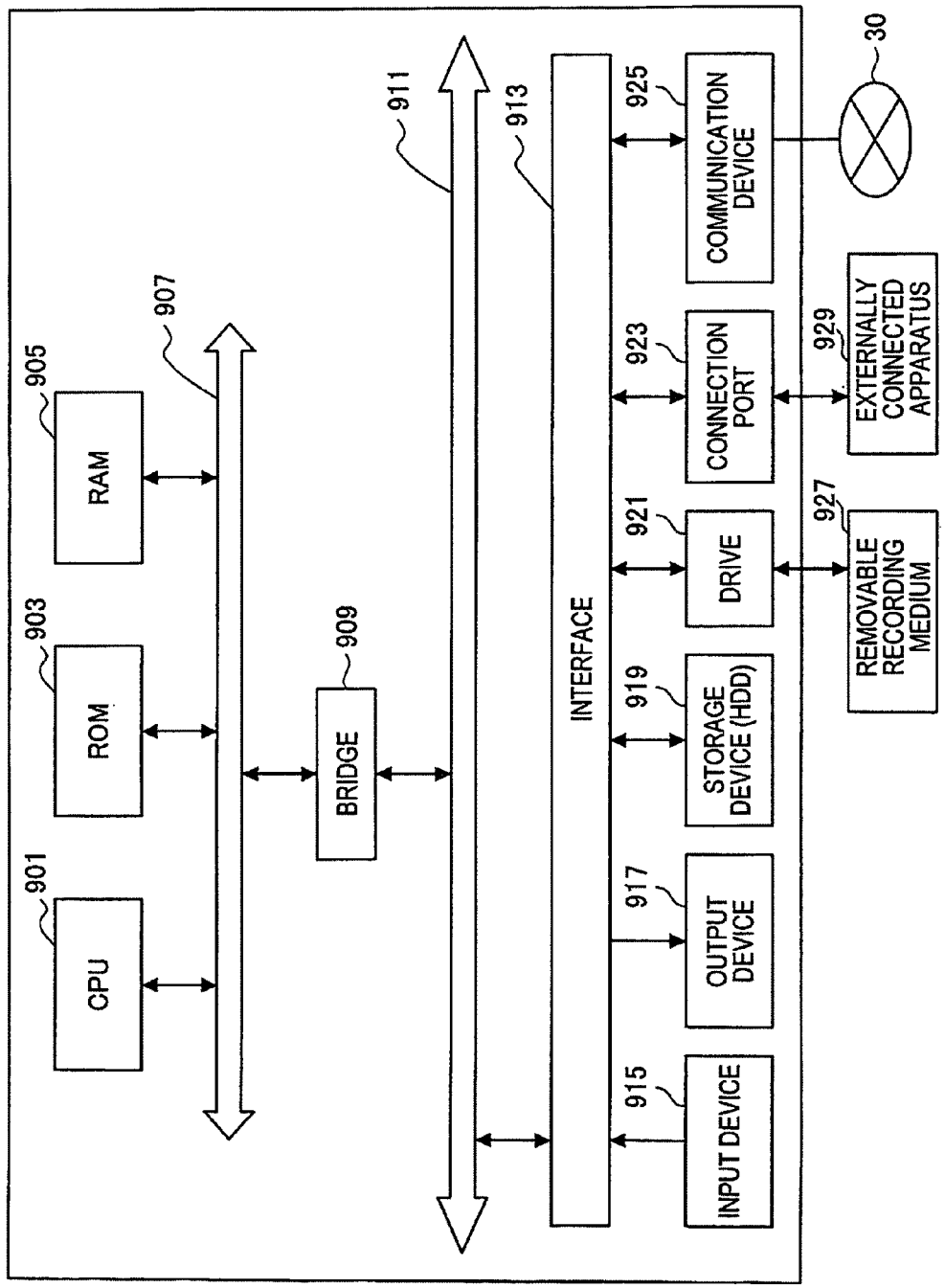
FIG. 14 is a block diagram showing one example of a hardware configuration of an image processing apparatus according to the present embodiment.

Next, there will be described a hardware configuration of the image processing apparatus as typified by the television 200 described above. FIG. 14 is a block diagram for explaining the hardware configuration of the image processing apparatus capable of performing various functions of the aforementioned embodiment.

The image processing apparatus mainly includes a CPU 901, a ROM 903, a RAM 905, a host bus 907, a bridge 909, an external bus 911, an interface 913, an input device 915, an output device 917, a storage device 919, a drive 921, a connection port 923 and a communication device 925.

The CPU 901 functions as a calculation processing device and a control device, and controls all or some of the operations inside the image processing apparatus according to various programs recorded in the ROM 903, the RAM 905, the storage device 919 or the removable recording medium 20. The ROM 903 stores therein the programs or calculation parameters used by the CPU 901. The RAM 905 temporarily stores therein the programs used by the CPU 901 for its execution, or the parameters or the like arbitrarily changed in its execution. These are interconnected via the host bus 907 which is configured with an internal bus such as CPU bus.

The host bus 907 is connected to the external bus 911 such as PCI (Peripheral Component Interconnect/Interface) bus via the bridge 909.

The input device 915 is a user-operating operation means such as a pointer, a mouse, a keyboard, a touch panel, a button, a switch or a lever. Further, the input device 915 may be, for example, a remote control means (so-called remote controller) utilizing infrared ray or other radio wave, or may be an externally connected apparatus 929 such as a digital camera, a cell phone and a PDA corresponding to the operation of the image processing apparatus. Furthermore, the input device 915 is configured with an input control circuit for generating an input signal and outputting it to the CPU 901 based on the information which a user inputs by using the above operation unit, for example. The user of the image processing apparatus can input various data or instruct a processing operation to the image processing apparatus by operating the input device 915.

The output device 917 is configured with a device capable of visually notifying the user of the acquired information such as a CRT display device, a liquid crystal device, a plasma display device, an EL display device or a lamp. Further, the output device 917 may include a device capable of visually notifying the user of the acquired information such as an audio output device including a speaker and a headphone. The output device 917 outputs the results obtained by various processings performed by the image processing apparatus, for example. Specifically, the display device displays the results acquired by various processings performed by the image processing apparatus in text or image. On the other hand, the audio output device converts an audio signal made of reproduced audio data or acoustic data into an analog signal for output. In the aforementioned embodiment, the output device 917 can display an image such as a photographed image, a map image and an associated image or text information such as landmark information.

The storage device 919 is a data storage device configured as one example of a storage unit of an image processing apparatus, and is configured with a magnetic storage device such as HDD (Hard Disk Drive), a semiconductor storage device, an optical storage device, a magnetooptical device or the like, for example. The storage device 919 stores therein programs or various data to be executed by the CPU 901, externally acquired image signal data and the like.

The drive 921 is a reader/writer for recording medium and is embedded in the image processing apparatus or externally attached thereto. The drive 921 reads information recorded in the attached removable recording medium 20 such as a magnetic disk, an optical disk, a magneto-optical disk or a semiconductor memory, and outputs the read information to the RAM 905. Furthermore, the drive 921 can write records in the attached removable recording medium 20 such as a magnetic disk, an optical disk, a magneto-optical disk, or a semiconductor memory. The removable recording medium 20 is, for example, a DVD medium, an HD-DVD medium, a Blu-ray (registered trademark) medium, a compact flash (registered trademark), a memory stick (registered trademark), an SD memory card, or the like. Alternatively, the removable recording medium 20 may be, for example, an IC card (Integrated Circuit Card) equipped with a non-contact IC chip or an electronic appliance.

The connection port 923 is a port for allowing devices to directly connect to the image processing apparatus, for example, a USB (Universal Serial Bus) port, an IEEE 1394 port such as i.Link, a SCSI (Small Computer System Interface) port, an RS-232C port, an optical audio terminal, an HDMI (High-Definition Multimedia Interface) port, and the like. By the externally connected apparatus 929 connecting to this connection port 923, the image processing apparatus directly obtains acoustic signal data or image signal data from the externally connected apparatus 929 or provides the acoustic signal data or the image signal data to the externally connected apparatus 929.

The communication device 925 is a communication interface configured from, for example, a communication device for connecting to a communication network 30. The communication device 925 is, for example, a wired or wireless LAN (Local Area Network), a communication card for Bluetooth, a router for optical communication, a modem for various communications, or the like. This communication device 925 can transmit and receive signals and the like in accordance with a predetermined protocol such as TCP/IP on the Internet and with other communication devices, for example. Further, the communication network 30 connected to the communication device 925 is configured from a network and the like, which is connected via wired or wirelessly, and may be, for example, the Internet, a home LAN, infrared communication, radio wave communication, satellite communication, or the like.

Heretofore, an example of the hardware configuration capable of realizing the functions of the image processing apparatus according to each embodiment of the present invention has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment. When a television receiver is utilized as the image processing apparatus, it is naturally possible to additionally include the hardware configurations necessary for broadcast reception such as broadcast reception antenna, tuner, decoder and the like.

Furthermore, the hardware configuration capable of realizing the functions of various servers 300, 400 and 500 according to the embodiment of the present invention can be also realized by providing the same functions as those of the hardware configuration of the image processing apparatus shown in FIG. 14 and thus the details thereof will be omitted.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, there has been described the television receiver 200 as one example of the image processing apparatus in the above embodiment, but the present invention is not limited to the example. The image processing apparatus may be a personal computer or the like, for example, as long as it includes a display for displaying image data and a communication control unit communicable with various servers. Further, there has been mainly described the digital images photographed by the digital camera 10 as photographed images in the above embodiment, but the present invention is not limited to the example. Any image data may be employed as long as it records therein position information such as latitude/longitude, and may be image data photographed by a cell phone with the GPS function, PDA, music player, game device or the like.

In the present specification, the steps described in the sequence diagrams include the processings performed in a time-series manner in the described order and the processings performed in parallel or individually even if not necessarily performed in a time-series manner. It is naturally possible to appropriately change also the order of the steps performed in a time-series manner in some cases. For example, in the processing flow shown in FIG. 6, for convenient explanation, after the map image is transmitted from the map information providing server 300 (step 610), the landmark information is transmitted from the landmark information providing server 400 (step 616). However, these processings are performed in parallel and can be naturally changed in its order or performed at the same time.

REFERENCE SIGNS LIST

10 digital camera
20 recording medium
30 communication network
100 image processing system
200 television
202, 302, 402, 502 communication control unit
204 operation unit
206 image data acquisition unit
208 display unit
209 display control unit
210 position information extraction unit
212 map image acquisition unit
214, 506 landmark information acquisition unit
216 associated image acquisition unit
218, 304, 404, 504 storage unit
220 image data upload unit
300 map information providing server
306, 406 position information acquisition unit
308 map image retrieval unit
310 map image providing unit
400 landmark information providing server
408 landmark information retrieval unit
410 landmark information providing unit
500 image sharing server
512 upload control unit
508 associated image retrieval unit
510 associated image providing unit

The invention claimed is:

1. An image processing apparatus comprising:
a position information extraction unit that extracts position information from image data selected by a user, wherein the image data is received from an image capture device;
a communication control unit that exchanges data, via a communication network, with a map information providing server for providing map images, a landmark information providing server for providing landmark information on landmarks, and an image sharing server for providing a service of publicizing image data over the Internet;
a map image acquisition unit that transmits the position information extracted by the position information extraction unit to the map information providing server and acquires a map image corresponding to the extracted position information from the map information providing server, via the communication control unit;
a landmark information acquisition unit that transmits the position information extracted by the position information extraction unit to the landmark information providing server and acquires landmark information corresponding to the extracted position information from the landmark information providing server, via the communication control unit;
an associated image acquisition unit that transmits the landmark information acquired by the landmark information acquisition unit to the image sharing server and acquires an associated image corresponding to the acquired landmark information from the image sharing server, via the communication control unit; and
a display unit that simultaneously displays the image data selected by the user, the map image acquired from the map information providing server, the landmark information acquired from the landmark information providing server and the associated image acquired from the image sharing server,
wherein the display of the landmark information comprises symbols superimposed on the map image and a list of selectable landmark names respectively corresponding to the symbols, and
wherein when a name is selected from the list, an associated photograph relating to the selected name is displayed on the map at a position corresponding to the symbol for the selected name.

2. The image processing apparatus according to claim 1, wherein the display unit displays the image data, the landmark information and the associated image to be overlapped on the map image acquired from the map information providing server at corresponding positions, respectively.

3. The image processing apparatus according to claim 2, wherein the display unit sequentially displays a plurality of associated images acquired by the associated image acquisition unit.

4. The image processing apparatus according to claim 3, wherein the display unit sequentially displays the associated images in an order from the nearest date to the photographing date of the image selected by the user, based on the photographing dates recorded in the associated images.

5. The image processing apparatus according to claim 4, wherein the landmark information acquired by the landmark information acquisition unit is information on landmarks present around the position corresponding to the position information extracted by the position information extraction unit.

6. The image processing apparatus according to claim 5, wherein the associated image acquired by the associated image acquisition unit is image data recording therein the landmark information acquired by the landmark information acquisition unit as tag information among the image data publicized over the Internet by the image sharing server.

7. The image processing apparatus according to claim 1, further comprising an image data upload control unit that adds the landmark information acquired by the landmark information acquisition unit to the image data selected by the user to transmit to the image sharing server and requests to publicize the image data with an image sharing service over the Internet provided by the image sharing server.

8. An image processing method comprising the steps of:
receiving image data from an image capture device;
extracting a position information from the image data selected by a user;
transmitting the extracted position information to a map information providing server, a landmark information providing server, and an image sharing server via a communication network;
acquiring a map image corresponding to the extracted position information from the map information providing server;
acquiring a landmark information corresponding to the extracted position information from the landmark information providing server;
acquiring an associated image corresponding to the acquired landmark information from the image sharing server; and
simultaneously displaying the image data selected by the user, the acquired map image, the acquired landmark information and the acquired associated image,
wherein the display of the landmark information comprises symbols superimposed on the map image and a list of selectable landmark names respectively corresponding to the symbols, and
wherein when a name is selected from the list, an associated photograph relating to the selected name is displayed on the map at a position corresponding to the symbol for the selected name.

9. An image processing program that, when executed by a processor, causes a computer to perform a method, the method comprising:
receiving image data from an image capture device;
extracting a position information from the image data selected by a user;
transmitting the extracted position information to a map information providing server, a landmark information providing server, and an image sharing server via a communication network;
acquiring a map image corresponding to the extracted position information from the map information providing server;
acquiring a landmark information corresponding to the extracted position information from the landmark information providing server;
acquiring an associated image corresponding to the acquired landmark information from the image sharing server; and
simultaneously displaying the image data selected by the user, the acquired map image, the acquired landmark information, and the acquired associated image,
wherein the display of the landmark information comprises symbols superimposed on the map image and a list of selectable landmark names respectively corresponding to the symbols, and
wherein when a name is selected from the list, an associated photograph relating to the selected name is displayed on the map at a position corresponding to the symbol for the selected name.

10. An image processing system comprising:

an image processing apparatus including:

a position information extraction unit that extracts position information from image data selected by a user, wherein the image data is received from an image capture device;

a communication control unit that exchanges data, via a communication network, with a map information providing server for providing map images, a landmark information providing server for providing landmark information on landmarks, and an image sharing server for providing a service of publicizing image data over the Internet;

a map image acquisition unit that transmits the position information extracted by the position information extraction unit to the map information providing server and acquires a map image corresponding to the extracted position information from the map information providing server, via the communication control unit;

a landmark information acquisition unit that transmits the position information extracted by the position information extraction unit to the landmark information providing server and acquires landmark information corresponding to the extracted position information from the landmark information providing server, via the communication control unit;

an associated image acquisition unit that transmits the landmark information acquired by the landmark information acquisition unit to the image sharing server and acquires an associated image corresponding to the acquired landmark information from the image sharing server, via the communication control unit; and a display unit that simultaneously displays the image data selected by the user, the map image acquired from the image information providing server, the landmark information acquired from the landmark information providing server and the associated image acquired from the image sharing server;

a map image providing server including:

a storage unit that stores map images corresponded to predetermined position information;

a map image retrieval unit that retrieves a map image corresponding to the position information transmitted from the image processing apparatus from among a plurality of map images recorded in the storage unit in response to a request from the image processing apparatus; and a map image providing unit that transmits the map image retrieved by the map image retrieval unit to the image processing apparatus via a communication network;

a landmark information providing server including:

a storage unit that stores landmark information corresponded to predetermined position information;

a landmark information retrieval unit that retrieves landmark information corresponding to the position information transmitted from the image processing apparatus from among a plurality of landmark information recorded in the storage unit in response to a request from the image processing apparatus; and a landmark information providing unit that transmits the landmark information retrieved by the landmark information retrieval unit to the image processing apparatus via a communication network; and an image sharing server including:

a storage unit that stores image data recording therein predetermined tag information containing landmark information;

an associated image retrieval unit that retrieves image data, containing the landmark information transmitted from the image processing apparatus as the tag information, from among a plurality of image data recorded in the storage unit in response to a request from the image processing apparatus; and an associated image providing unit that transmits the image data retrieved by the associated image retrieval unit as an associated image to the image processing apparatus via a communication network, wherein the display of the landmark information comprises symbols superimposed on the map image and a list of selectable landmark names respectively corresponding to the symbols, and wherein when a name is selected from the list, an associated photograph relating to the selected name is displayed on the map at a position corresponding to the symbol for the selected name.

* * * * *